(12) United States Patent
Ohno et al.

(10) Patent No.: US 7,517,502 B2
(45) Date of Patent: Apr. 14, 2009

(54) HONEYCOMB STRUCTURAL BODY

(75) Inventors: Kazushige Ohno, Ibi-gun (JP); Yukio Oshimi, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 403 days.

(21) Appl. No.: 10/521,592

(22) PCT Filed: Oct. 25, 2004

(86) PCT No.: PCT/JP2004/015808

§ 371 (c)(1),
(2), (4) Date: Oct. 27, 2005

(87) PCT Pub. No.: WO2005/039738

PCT Pub. Date: May 6, 2005

(65) Prior Publication Data

US 2006/0159602 A1    Jul. 20, 2006

(30) Foreign Application Priority Data

Oct. 23, 2003    (JP) .............................. 2003-363783

(51) Int. Cl.
*B01D 50/00* (2006.01)
*B01D 24/00* (2006.01)
*B01J 8/02* (2006.01)

(52) U.S. Cl. ...................... 422/177; 422/180; 422/211; 55/523

(58) Field of Classification Search ................. 422/180, 422/177, 211; 55/523
See application file for complete search history.

(56) References Cited

U.S. PATENT DOCUMENTS 4,276,071 A    6/1981    Outland (Continued)

FOREIGN PATENT DOCUMENTS

EP    0 043 694    12/1986

(Continued)

OTHER PUBLICATIONS

U.S. Appl. No. 10/129,126.
U.S. Appl. No. 11/225,197.

(Continued)

*Primary Examiner*—Walter D Griffin
*Assistant Examiner*—Lessanework Seifu
(74) *Attorney, Agent, or Firm*—Oblon, Spivak, McClelland, Maier & Neustadt, P.C.

(57) ABSTRACT

An object of the present invention is to provide a honeycomb structural body which makes it possible to prevent a thermal stress from concentrating on plugs for sealing a group of inlet-side through holes and the vicinity thereof during a regenerating process, and consequently to prevent occurrence of cracks. The honeycomb structural body of the present invention is a pillar-shaped honeycomb structural body mainly made of porous ceramics, in which a plurality of through holes are placed in parallel with one another in the length direction with a partition wall interposed therebetween. Herein, the through holes are constituted by a group of inlet-side through holes, whose ends are sealed by plugs at the outlet side such that the total sum of areas on cross sections perpendicular to the length direction is made relatively greater, and a group of outlet-side through holes, whose ends are sealed by plugs at the inlet side such that the total sum of areas on the cross sections thereof is made relatively smaller. Supposing that the aperture rate on the inlet side is X (%) and that the total sum of thermal capacities of the plugs which seal the group of inlet-side through holes at 500° C. per 11.8 cm$^2$ of the end face on the outlet side containing the group of the outlet-side through holes is represented by Y(J/K), the relationship indicated by the following inequalities (1) and (2) is satisfied.

$$0.0157X - 0.0678 < Y < 1.15X - 5 \quad (1)$$

$$35 \leq X \leq 60 \quad (2)$$

13 Claims, 9 Drawing Sheets

A-A Line cross-sectional view

U.S. PATENT DOCUMENTS

| | | | |
|---|---|---|---|
| 4,329,162 A * | 5/1982 | Pitcher, Jr. ............... | 55/523 |
| 4,364,761 A | 12/1982 | Berg et al. | |
| 4,416,676 A | 11/1983 | Montierth | |
| 4,417,908 A | 11/1983 | Pitcher | |
| 4,420,316 A | 12/1983 | Frost et al. | |
| 4,643,749 A | 2/1987 | Miura | |
| 4,857,089 A | 8/1989 | Kitagawa et al. | |
| 5,545,243 A | 8/1996 | Kotani et al. | |
| 5,914,187 A | 6/1999 | Naruse et al. | |
| 5,930,994 A | 8/1999 | Shimato et al. | |
| 6,395,370 B1 | 5/2002 | Noda et al. | |
| 6,447,564 B1 | 9/2002 | Ohno et al. | |
| 6,508,852 B1 | 1/2003 | Hickman et al. | |
| 6,565,630 B2 | 5/2003 | Ohno et al. | |
| 6,596,666 B1 | 7/2003 | Yamada | |
| 6,669,751 B1 | 12/2003 | Ohno et al. | |
| 6,770,116 B2 | 8/2004 | Kojima | |
| 6,939,825 B1 | 9/2005 | Ohno et al. | |
| 2002/0180117 A1 | 12/2002 | Yamamoto et al. | |
| 2003/0041730 A1 | 3/2003 | Beall et al. | |
| 2003/0167755 A1 | 9/2003 | Nakatani et al. | |
| 2004/0031264 A1 | 2/2004 | Kojima | |
| 2004/0033175 A1 | 2/2004 | Ohno et al. | |
| 2004/0055265 A1 | 3/2004 | Ohno et al. | |
| 2004/0097370 A1 | 5/2004 | Ichikawa et al. | |
| 2004/0161596 A1 | 8/2004 | Taoka et al. | |
| 2004/0223892 A1 | 11/2004 | Kojima | |
| 2005/0011174 A1 | 1/2005 | Hong et al. | |
| 2005/0016140 A1 | 1/2005 | Komori et al. | |
| 2005/0016141 A1 | 1/2005 | Hong et al. | |
| 2005/0076626 A1 | 4/2005 | Kudo et al. | |
| 2005/0102987 A1 | 5/2005 | Kudo | |
| 2005/0109023 A1 | 5/2005 | Kudo et al. | |
| 2005/0115224 A1 | 6/2005 | Kojima | |
| 2005/0153099 A1 | 7/2005 | Yamada | |
| 2005/0159310 A1 | 7/2005 | Ohno et al. | |
| 2005/0160710 A1 | 7/2005 | Taoka et al. | |
| 2005/0161849 A1 | 7/2005 | Ohno et al. | |
| 2005/0169818 A1 | 8/2005 | Ohno et al. | |
| 2005/0169819 A1 | 8/2005 | Shibata | |
| 2005/0175514 A1 | 8/2005 | Ohno | |
| 2005/0176581 A1 | 8/2005 | Ohno et al. | |
| 2005/0178098 A1 | 8/2005 | Ono et al. | |
| 2005/0180898 A1 | 8/2005 | Yamada | |
| 2005/0214504 A1 | 9/2005 | Yoshida | |
| 2005/0229565 A1 | 10/2005 | Yoshida | |
| 2005/0235621 A1 | 10/2005 | Kunieda et al. | |
| 2005/0247038 A1 | 11/2005 | Takahashi | |
| 2005/0272602 A1 | 12/2005 | Ninomiya | |
| 2006/0019061 A1 | 1/2006 | Oshimi | |
| 2006/0029897 A1 | 2/2006 | Saijo et al. | |
| 2006/0029898 A1 | 2/2006 | Saijo et al. | |
| 2006/0032203 A1 | 2/2006 | Komori et al. | |
| 2006/0043652 A1 | 3/2006 | Saijo et al. | |
| 2006/0059877 A1 | 3/2006 | Yoshida | |
| 2007/0227109 A1 | 10/2007 | Hong et al. | |
| 2008/0085394 A1 | 4/2008 | Ohno et al. | |

FOREIGN PATENT DOCUMENTS

| | | |
|---|---|---|
| EP | 1 291 061 | 3/2003 |
| EP | 1 484 483 A1 | 12/2004 |
| EP | 1 502 639 A1 | 2/2005 |
| EP | 1 676 620 | 7/2006 |
| FR | 2 789 327 | 8/2000 |
| FR | 2 840 545 | 12/2003 |
| JP | 58-92409 | 6/1983 |
| JP | 58-150015 | 9/1983 |
| JP | 3-102016 | 10/1991 |
| JP | 5-68828 | 3/1993 |
| JP | 6-47620 | 6/1994 |
| JP | 2001-96117 | 4/2001 |
| JP | 2002-159811 | 6/2002 |
| JP | 2003-1029 | 1/2003 |
| JP | 2003-176709 | 6/2003 |
| JP | 2003-236322 | 8/2003 |
| WO | 01/23069 | 4/2001 |
| WO | 02/10562 | 2/2002 |
| WO | WO 02/32545 | 4/2002 |
| WO | 02/096827 | 12/2002 |
| WO | 02/100514 | 12/2002 |
| WO | WO 03/072913 A1 | 9/2003 |
| WO | 03/080218 | 10/2003 |

OTHER PUBLICATIONS

U.S. Appl. No. 10/502,044, filed Jan. 24, 2005, Taoka et al.
U.S. Appl. No. 10/515,179, filed Jul. 19, 2005, Yamada.
U.S. Appl. No. 10/516,328, filed Aug. 17, 2005, Komori et al.
U.S. Appl. No. 10/518,548, filed Jan. 3, 2005, Takahashi.
U.S. Appl. No. 10/521,592, filed Oct. 27, 2005, Ohno et al.
U.S. Appl. No. 10/527,531, filed Mar. 11, 2005, Ogyu et al.
U.S. Appl. No. 10/530,561, filed Apr. 7, 2005, Komori et al.
U.S. Appl. No. 11/174,726, filed Jul. 6, 2005, Ohno et al.
U.S. Appl. No. 11/174,483, filed Jul. 6, 2005, Saijo et al.
ASTM D 2766-95 (Reapproved 2005), Standard Test Method for Specific Heat of Liquids and Solids, pp. 1-6.
ASTM E 1269-05 (originally approved 1990), Standard Test Method for Determining Specific Heat Capacity by Defferential Scanning Calorimetry, pp. 1-6.
SAE Technical Paper Series 932495 "SiC as a Substrate for Diesel Particulate Filters", 1993.

* cited by examiner

A-A Line cross-sectional view

HONEYCOMB STRUCTURAL BODY

TECHNICAL FIELD

This application claims benefit of priority to Japanese Patent Application No. 2003-363783, filed on Oct. 23, 2003, the contents of which are incorporated by reference herein.

The present invention relates to a honeycomb structural body used as a filter for removing particulates and the like contained in exhaust gases discharged from an internal combustion system such as a diesel engine, a catalyst supporting member and the like.

BACKGROUND ART

In recent years, particulates, such as soot, contained in exhaust gases that are discharged from internal combustion engines of vehicles, such as buses and trucks, and construction machines, have raised serious problems as those particulates are harmful to the environment and the human body.

Various honeycomb structural bodies made of porous ceramics, which serve as filters capable of collecting particulates in exhaust gases to purify the exhaust gases, have been proposed.

Conventionally, with respect to the honeycomb structural body of this type, a filter having the following structure has been proposed in which: two kinds of through holes, that is, a group of through holes with a relatively large capacity (hereinafter, may be referred to as large-capacity through hole) and a group of through holes with a relatively small capacity (hereinafter, may be referred to as small-capacity through hole), are prepared, and the end on the exhaust gas outlet side of each through hole belonging to the group of large-capacity through holes is sealed with a plug, with the end on the exhaust gas inlet side of each through hole belonging to the group of small-capacity through holes being sealed with a plug, so that the surface area of the through holes with the opened inlet side (hereinafter, may be referred to as inlet-side through holes) is made relatively greater than the surface area of the through holes with the opened outlet side (hereinafter, may be referred to as outlet-side through holes); thus, it becomes possible to suppress an increase in pressure loss upon collecting particulates (for example, see Patent Document 1, Patent Document 2 and Patent Document 3). With respect to the filter of this type, filters in which the shapes of the inlet-side through holes and the outlet-side through holes are respectively formed into an octagonal shape and a quadrangular shape have been proposed (for example, see Patent Document 4 and Patent Document 5).

Moreover, another filter has been proposed in which: the number of the inlet-side through holes is made greater than the number of the outlet-side through holes so that the surface area of the group of inlet-side through holes is made relatively greater than the surface area of the group of outlet-side through holes (for example, see Patent Document 6 and FIG. 3 of Patent Document 7).

In the case of the honeycomb structural bodies to be used as the exhaust gas purifying filters disclosed in Patent Documents 1 to 7, in comparison with a honeycomb structural body in which the total amount of the surface area of the group of the inlet-side through holes and the total amount of the surface area of the group of the outlet-side through holes are the same, since the total amount of the surface area of the inlet-side through holes is made relatively greater; thus, the deposition layer of collected particulates becomes thinner, thereby making it possible to suppress an increase in a pressure loss at the time of collecting particulates, and also to increase the collection limit amount of particulates.

Moreover, after having collected a predetermined amount of particulates, an engine controlling process is carried out to raise the exhaust gas temperature or the temperature of a heater placed on the upstream side of exhaust gases from the honeycomb structural body so that a regenerating process that makes the particulates in contact with high-temperature gases to burn the particulates is carried out; and in this case, the burning rate of the particulates can be increased by making the thickness of the deposition layer of the particulates thinner.

Among the honeycomb structural bodies in which the surface area of the group of inlet-side through holes is made relatively greater than the surface area of the group of outlet-side through holes, in the case of the honeycomb structural body having a greater aperture rate, a low density and a low thermal capacity can be achieved because the rate of the capacity of the through holes that occupy the honeycomb structural body increases; therefore, it becomes possible to provide a quick temperature-raising process, and consequently to improve the response property exerted upon heating exhaust gases.

However, the filters having a greater aperture rate on the inlet side have a problem that cracks tend to occur in the plugs that seal the group of inlet-side through holes and the vicinity thereof (hereinafter, may be referred to as outlet-side sealing portions) at the time of the regenerating process.

Conventionally, with respect to the thickness of the plugs in the honeycomb structural body, for example, Patent Document 8 describes that the thickness is desirably set in a range from 2 to 5 mm.

Patent Document 1: JP-A 56-124417 (1981)
Patent Document 2: JP-A 62-96717 (1987)
Patent Document 3: U.S. Pat. No. 4,364,761
Patent Document 4: WO 02/10562A1 pamphlet
Patent Document 5: FR Patent No. 2789327
Patent Document 6: JP-A 58-196820 (1983)
Patent Document 7: U.S. Pat. No. 4,417,908
Patent Document 8: US Patent No. 2003/0041730A1

DISCLOSURE OF THE INVENTION

Problems to be Solved by the Invention

In order to solve the above-mentioned problems, the inventors of the present invention have studied hard and found that the reason for the cracks occurring in the outlet-side sealing portions at the time of the regenerating process is because, when the aperture rate X on the inlet side is increased, particulates tend to be captured in deeper portions (outlet side) of the inlet-side through holes and the thermal capacity of the honeycomb structural body becomes smaller to cause an abrupt temperature rise, in particular, in the outlet-side sealing portions at the time of the regenerating process and the subsequent high temperature in local portions.

Based upon the above-mentioned results, the inventors of the present invention have found that, by increasing the thermal capacity of the outlet-side sealing portions to a certain degree, it becomes possible to prevent the outlet-side sealing portions from locally having a high temperature at the time of the regenerating process, and consequently to prevent occurrence of cracks in the outlet-side sealing portions; thus, the present invention has been completed.

Here, the above-mentioned Patent Document 8 and other documents neither describe nor imply the relationship between the aperture rate X on the inlet side and the total sum Y of thermal capacities of the plugs that seal the group of inlet-side through holes.

MEANS FOR SOLVING THE PROBLEMS

According to a first aspect of the present invention, a honeycomb structural body, which is a pillar-shaped honeycomb structural body mainly made of porous ceramics, in which a plurality of through holes are placed in parallel with one another in the length direction with a partition wall interposed therebetween, wherein said plurality of through holes comprises:

a group of inlet-side through holes, whose ends are sealed by plugs at the outlet side such that the total sum of areas on cross sections perpendicular to the length direction is made relatively greater; and a group of outlet-side through holes, whose ends are sealed by plugs at the inlet side such that the total sum of areas on the cross sections thereof is made relatively smaller, supposing that the aperture rate on the inlet side is X (%) and that the total sum of thermal capacities of the plugs which seal the group of inlet-side through holes at 500° C. per 11.8 cm² of the end face on the outlet side containing the group of the outlet-side through holes is represented by Y(J/K), the relationship indicated by the following inequalities (1) and (2) being satisfied.

$$0.0157X-0.0678<Y<1.15X-5 \quad (1)$$

$$35 \leq X \leq 60 \quad (2)$$

According to the first aspect of the present invention, the honeycomb structural body is designed so that, supposing that the total sum of thermal capacities of the plugs which seal the group of inlet-side through holes at 25° C. per 11.8 cm² of the end face on the outlet side containing the group of the outlet-side through holes is represented by Z(J/K), a relationship indicated by the following inequality (3) is satisfied.

$$0.013X-0.09<Z<0.7X-2.5 \quad (3)$$

Moreover, according to the first aspect of the present invention, the honeycomb structural body desirably satisfies the following inequality (4).

$$0.05X-0.55<Y<0.574X-2 \quad (4)$$

Furthermore, according to the first aspect of the present invention, the honeycomb structural body desirably satisfies the following inequality (5)

$$0.05X-0.55<Z<0.354X-1 \quad (5)$$

According to the first aspect of the present invention, the porous ceramic is desirably prepared as porous silicon carbide.

According to a second aspect of the present invention, a honeycomb structural body has a structure in which a sealing material layer is formed on a circumferential face of a honeycomb block that is formed by combining a plurality of honeycomb structural bodies through a sealing material layer with one another.

Here, the honeycomb structural body according to the first aspect of the present invention, as a single unit, may be used as a filter, except that it is used as constituent members of the honeycomb structural body according to the second aspect of the present invention.

In the following description, a honeycomb structural body having a structure as one integral unit as a whole, that is, the honeycomb structural body according to the first aspect of the present invention, is also referred to as an integral honeycomb structural body, and a honeycomb structural body having a structure in which a plurality of ceramic members are combined with one another through sealing material layer, that is, the honeycomb structural body according to the second aspect of the present invention, is also referred to as an aggregated honeycomb structural body. Here, in the case where no discrimination is required between the integral honeycomb structural body and the aggregated honeycomb structural body, the corresponding structural body is referred to as a honeycomb structural body.

EFFECTS OF THE INVENTION

According to the first aspect of the present invention, the honeycomb structural body is designed in such a manner that with respect to the aperture rate X (%) on the inlet side and the total sum Y of thermal capacities of the plugs that seal the group of inlet-side through holes at 500° C. per 11.8 cm² of the end face on the outlet side containing the group of the outlet-side through holes, the relationship indicated by the above-mentioned in equalities (1) and (2) is satisfied; therefore, it becomes possible to prevent the outlet-side sealing portions from locally having a high temperature at the time of the regenerating process, and also to alleviate a thermal stress imposed on the outlet-side sealing portions to suppress occurrence of cracks therein. Moreover, with respect to the relationship among the aperture rate X on the inlet side, the total sum Y of thermal capacities of the plugs that seal the group of inlet-side through holes at 500° C. per 11.8 cm² of the end face on the outlet side containing the group of the outlet-side through holes, and/or the total sum Z of thermal capacities of the plugs that seal the group of inlet-side through holes at 25° C., the above-mentioned inequalities (3) to (5) are satisfied so that it becomes possible to more effectively alleviate a thermal stress imposed on the outlet-side sealing portions, and consequently to suppress occurrence of cracks.

In the honeycomb structural body according to the first aspect of the present invention, in case porous silicon carbide is used as the porous ceramic material, it becomes possible to provide a superior thermal conductivity, heat resistance, mechanical properties, chemical resistance and the like.

In the honeycomb structural body according to the second aspect of the present invention, a plurality of honeycomb structural bodies according to the first aspect of the present invention are combined with one another through sealing material layer; therefore, it becomes possible to reduce a thermal stress by using the sealing material layer to improve heat resistance, and it also becomes possible to freely adjust the size by increasing or reducing the number of the honeycomb structural bodies according to the first aspect of the present invention. The honeycomb structural body according to the second aspect of the present invention is of course allowed to exert the same effects as the honeycomb structural body according to the first aspect of the present invention.

BEST MODE FOR CARRYING OUT THE INVENTION

A honeycomb structural body according to the first aspect of the present invention is a pillar-shaped honeycomb structural body mainly made of porous ceramics, in which a plurality of through holes are placed in parallel with one another in the length direction with a partition wall interposed therebetween, wherein
said plurality of through holes comprises:
a group of inlet-side through holes, whose ends are sealed by plugs at the outlet side such that the total sum of areas on cross sections perpendicular to the length direction is made relatively greater; and
a group of outlet-side through, whose ends are sealed by plugs at the inlet side such that the total sum of areas on the cross sections thereof is made relatively smaller,
supposing that the aperture rate on the inlet side is X (%) and that the total sum of thermal capacities of the plugs which seal the group of inlet-side through holes at 500° C. per 11.8 cm² of the end face on the outlet side containing the group of the outlet-side through holes is represented by Y(J/K),
the relationship indicated by the following inequalities (1) and (2) being satisfied.

$$0.0157X-0.0678 < Y < 1.15X-5 \quad (1)$$

$$35 \leq X \leq 60 \quad (2)$$

In this case, the aperture rate X on the inlet side refers to a ratio of the total sum of the areas of the group of inlet-side through holes to the whole area of the end face on the inlet side of the honeycomb structural body. Here, the whole area of the end face on the inlet side of the honeycomb structural body corresponds to the total sum of areas of portions constituted by the through holes and the partition wall, and is defined not to include the portion occupied by the sealing material layer in the total area of the end face on the inlet side.

FIG. 1(a) is a perspective view that schematically shows one example of an integral honeycomb structural body of the present invention, and FIG. 1(b) is across-sectional view taken along line A-A of the integral honeycomb structural body of the present invention shown in FIG. 1(a).

As shown in FIG. 1, the integral honeycomb structural body 20 having an approximately square pillar shape has a structure in which a number of through holes 21 are placed in parallel with one another in the length direction with a partition wall 23 being interposed inbetween. The through holes 21 include two kinds of through holes, that is, a group of inlet-side through holes 21a, whose ends are sealed by plugs 22 at the outlet side of the integral honeycomb structural body 20 and a group of the outlet-side through holes 21b, whose ends are sealed by plugs 22 at the inlet side of the integral honeycomb structural body 20, and the total sum of areas on the cross section perpendicular to the length direction of the group of inlet-side through holes 21a is made relatively greater in comparison with that of the group of outlet-side through holes 21b so that the partition wall 23 that separates these through holes 21 are allowed to serve as filters. In other words, exhaust gases that have entered the group of inlet-side through holes 21a are allowed to flow out of the group of outlet-side through holes 21b after always passing through the partition wall 23.

In the integral honeycomb structural body of the present invention, supposing that the aperture rate on the inlet side is X (%) and that the total sum of thermal capacities of the plugs which seal the group of inlet-side through holes at 500° C. per 11.8 cm² of the end face on the outlet side containing the group of the outlet-side through holes is represented by Y (J/K), the relationship indicated by the following inequalities (1) and (2) is satisfied.

$$0.0157X-0.0678 < Y < 1.15X-5 \quad (1)$$

$$35 \leq X \leq 60 \quad (2)$$

Here, the total sum Y of thermal capacities of the plugs that seal the group of inlet-side through holes 21a at 500° C. per 11.8 cm² of the end face on the outlet side containing the group of the outlet-side through holes refers to a total sum of thermal capacities that are obtained by measuring thermal capacities at 500° C., with respect to a plurality of plugs 22 the ends of which are included per area of 11.8 cm² of the end face on the outlet side of the integral honeycomb structural body 20, said end face on the outlet side is constituted by the partition wall 23, plugs 22 that seal the group of inlet-side through holes 21a and the group of outlet-side through holes 21b.

In the integral honeycomb structural body of the present invention, since the exhaust gas purifying filter is heated to a high temperature of about 500° C. at the time of the regenerating process, the total sum Y of thermal capacities of the plugs that seal the group of inlet-side through holes 21a at 500° C. per 11.8 cm² of the end face on the outlet side containing the group of the outlet-side through holes satisfies the relationship indicated by the above-mentioned inequality (1) with respect to the aperture rate X on the inlet side.

The lower limit of the total sum Y of thermal capacities of the plugs that seal the group of inlet-side through holes 21a at 500° C. per 11.8 cm² of the end face on the outlet side containing the group of the outlet-side through holes is set to 0.0157X-0.0678, and the upper limit of the total sum Y thereof is set to 1.15X-5. In the case of 0.0157X-0.0678≧Y, the total sum Y of thermal capacities of the plugs 22 that seal the group of inlet-side through holes 21a becomes too small in association with the aperture rate X on the inlet side; thus, at the time of the regenerating process, the outlet-side sealing portions have an abrupt temperature rise due to heat generation caused by burning of particulates accumulated in deep portions of the inlet-side through holes 21a to cause cracks due to thermal stress. In contrast, in the case of Y≧1.15X-5, the total sum Y of thermal capacities of the plugs 22 that seal the group of inlet-side through holes 21a becomes too great in association with the aperture rate X on the inlet side; thus, at the time of the regenerating process, the partition wall 23 that contacts the plugs 22 that seal the group of inlet-side through holes 21a come to have an abrupt temperature rise due to heat generation caused burning of particulates accumulated in deep portions of the inlet-side through holes 21a, while the plugs 22 that seal the group of inlet-side through holes 21a has a small temperature rise; thus, cracks tend to occur due to thermal stress in the vicinity of the interface between the plugs 22 and the partition wall 23.

The lower limit of the total sum Y of thermal capacities of the plugs 22 that seal the group of inlet-side through holes 21a at 500° C. per 11.8 cm² of the end face on the outlet side containing the group of the outlet-side through holes is desirably set to 0.05X-0.55, and the upper limit of the total sum Y thereof is desirably set to 0.574X-2. In other words, desirably, the integral honeycomb structural body of the present invention further satisfies the following inequality (4).

$$0.05X-0.55 < Y < 0.574X-2 \quad (4)$$

Moreover, the exhaust gas purifying filter is heated from normal temperature (about 25° C.) to about 500° C. at the time of the regenerating process; therefore, in the integral honeycomb structural body of the present invention, the total sum Z (J/K) of thermal capacities of the plugs 22 that seal the group of inlet-side through holes 21a at 25° C. per 11.8 cm² of the end face on the outlet side containing the group of the outlet-side through holes is desirably allowed to satisfy a relationship indicated by the following inequality (3) and further satisfy a relationship indicated by the following inequality (5), with respect to the aperture rate X on the inlet side.

$$0.013X - 0.09 < Z < 0.7X - 2.5 \quad (3)$$

$$0.05X - 0.55 < Z < 0.354X - 1 \quad (5)$$

The lower limit of the aperture rate X on the inlet side is 35%, and the upper limit thereof is 60%.

In the case where the aperture rate X on the inlet side is less than 35% or the aperture rate X on the inlet side exceeds 60%, the tendency that particulates are easily collected in deep portions of the inlet-side through holes $21a$ is no longer exerted; therefore, it is not necessary to particularly adjust the aperture rate X on the inlet side and the total sum Y of thermal capacities of the plugs 22 that seal the group of inlet-side through holes $21a$. The lower limit of the aperture rate X on the inlet side is desirably set to 40%, and the upper limit thereof is desirably set to 55%.

In the integral honeycomb structural body of the present invention, with respect to the aperture rate X on the inlet side and the total sum Y of thermal capacities of the plugs that seal the group of inlet-side through holes at 500° C. per 11.8 cm$^2$ of the end face on the outlet side containing the group of the outlet-side through holes, the relationships indicated by the above-mentioned inequalities (1) and (2) are satisfied so that it becomes possible to alleviate generation of a thermal stress in the outlet-side sealing portions and consequently to suppress generation of cracks. Moreover, with respect to the relationship among/between: the aperture rate X (%) on the inlet side; and the total sum Y of thermal capacities of the plugs that seal the group of inlet-side through holes at 500° C. per 11.8 cm$^2$ of the end face on the outlet side containing the group of the outlet-side through holes, and/or the total sum Z of thermal capacities of the plugs that seal the group of inlet-side through holes at 25° C., the above-mentioned inequalities (3) to (5) are satisfied so that it becomes possible to more effectively alleviate a thermal stress imposed on the outlet-side sealing portions due to an abrupt temperature rise, and consequently to suppress occurrence of cracks.

Here, the total sum Y of thermal capacities of the plugs 22 that seal the group of inlet-side through holes $21a$ and the total sum Z of thermal capacities of the plugs that seal the group of inlet-side through holes at 500° C. are determined by appropriately selecting, for example, the material of the plugs 22 and the thickness of the plugs 22 (the amount of injection into the group of inlet-side through holes $21a$) so as to satisfy the relationships of the above-mentioned inequalities (1) to (5).

The integral honeycomb structural body 20 is mainly made of a porous ceramic material, and examples of the material include: nitride ceramics such as aluminum nitride, silicon nitride, boron nitride, titanium nitride and the like; carbide ceramics such as silicon carbide, zirconium carbide, titanium carbide, tantalum carbide, tungsten carbide and the like; and oxide ceramics such as alumina, zirconia, cordierite, mullite, silica and the like. Moreover, the integral honeycomb structural body 20 may be made of a composite material of silicon and silicon carbide or the like, or may be made of two or more kinds of materials such as aluminum titanate.

With respect to the particle size of the ceramic material to be used upon manufacturing the integral honeycomb structural body 20, although not particularly limited, those materials that are less likely to shrink in the succeeding sintering process are desirably used, and for example, those materials, prepared by mixing 100 parts by weight of powder having an average particle size in a range from 0.3 to 50 µm and 5 to 65 parts by weight of powder having an average particle size in a range from 0.1 to 1.0 µm, are desirably used. By mixing ceramic powders having the above-mentioned particle sizes at the above-mentioned blending ratios, an integral honeycomb structural body made of porous ceramics is manufactured.

Here, the plugs 22 and the partition wall 23 constituting the integral honeycomb structural body 20 are desirably made of the same porous ceramic material. This arrangement makes it possible to increase the bonding strength between the two members, and by adjusting the porosity of the plugs 22 in the same manner as that of the partition wall 23, it is possible to take the matching of the coefficient of thermal expansion of the partition wall 23 and the coefficient of thermal expansion of the plugs 22; thus, it becomes possible to prevent the occurrence of a gap between the plugs 22 and the partition wall 23 and the occurrence of a crack in the plugs 22 or in the partition wall 23 at a portion with which the plug 22 comes in contact, due to a thermal stress that is exerted upon production as well as upon use.

The plugs 22 may contain metal and the like in addition to the above-mentioned ceramics in order to adjust the thermal capacity thereof.

With respect to the metal, not particularly limited, examples thereof include iron, aluminum, metal silicon (Si) and the like. Each of these materials may be used alone, or two or more kinds of these may be used in combination.

With respect to the thickness of the plugs 22, although not particularly limited, in the case where the plugs 22 are made of porous silicon carbide, since the specific heat capacity of silicon carbide at 25° C. is 690 J/K·kg and since the specific heat capacity at 500° C. is 1120 J/K·kg, the thickness is desirably set in a range from 1 to 40 mm in order to satisfy the relationship indicated by the above-mentioned inequalities (1) and (2), and is more desirably set in a range from 3 to 20 mm in order to satisfy the relationship indicated by the above-mentioned inequalities (3) and (4).

Although not particularly limited, the lower limit of the thickness of the partition wall 23 is desirably set to 0.1 mm, and the upper limit of the thickness is desirably set to 1.2 mm. The thickness of less than 0.1 mm tends to cause insufficient strength in the integral honeycomb structural body 20. The thickness exceeding 1.2 mm makes it difficult for the partition wall 23 at portions where they are made in contact with the plugs 22 that seal the group of inlet-side through holes $21a$ to have a temperature rise, sometimes resulting in cracks due to thermal stress in the vicinity of the interface between the plugs 22 and the partition wall 23.

Although not particularly limited, the lower limit of the porosity of the integral honeycomb structural body 20 is desirably set to 20%, and the upper limit thereof is desirably set to 80%. When the porosity is less than 20%, the honeycomb structural body 20 is more likely to generate clogging, while the porosity exceeding 80% causes degradation in the strength of the honeycomb structural body 20; thus, it might be easily broken.

Here, the above-mentioned porosity can be measured through known methods, such as a mercury injection method, Archimedes method and a measuring method using a scanning electronic microscope (SEM).

The lower limit of the average pore diameter of the integral honeycomb structural body 20 is desirably set to 1 µm, and the upper limit thereof is desirably set to 100 µm. The average pore diameter of less than 1 µm tends to cause clogging of particulates easily. In contrast, the average pore diameter exceeding 100 µm tends to cause particulates to pass through the pores; thus, the particulates cannot be collected, making it unable to function as a filter.

The integral honeycomb structural body 20 shown in FIG. 1 has an approximately square pillar shape; however, the shape of the integral honeycomb structural body of the present invention is not particularly limited as long as it has a pillar shape, and, for example, pillar shapes having a shape, such as a polygonal shape, a circular shape, an elliptical shape and an arc shape, in the cross-section perpendicular to the length direction may be used.

Moreover, in the integral honeycomb structural body of the present invention, the through holes are constituted by two types of through holes, that is, a group of inlet-side through holes, whose ends are sealed by plugs at the outlet side such that the total sum of areas on cross sections perpendicular to the length direction is made relatively greater and a group of outlet-side through holes, whose ends are sealed by plugs at the inlet side such that the total sum of areas on the cross sections thereof is made relatively smaller.

With respect to combinations between the group of inlet-side through holes and the group of outlet-side through holes, the following combinations are proposed: (1) regarding individual through holes constituting the group of inlet-side through holes and individual through holes constituting the group of outlet-side through holes, the areas of the cross sections perpendicular to the length direction are the same, with the number of the through holes constituting the group of inlet-side through holes being made greater; (2) regarding individual through holes constituting the group of inlet-side through holes and individual through holes constituting the group of outlet-side through holes, the areas of the cross sections perpendicular to the length direction are different from each other, with the numbers of the through holes of the two types being different from each other; and (3) regarding individual through holes constituting the group of inlet-side through holes and individual through holes constituting the group of outlet-side through holes, the area of the cross sections of the through holes constituting the group of the inlet-side through holes is larger, with the numbers of the though holes of the two types being the same.

Moreover, with respect to the through holes constituting the group of inlet-side through holes and/or the through holes constituting the group of outlet-side through holes, through holes of one type having the same shape and the same area in the cross section perpendicular to the length direction may be used, or through holes of two or more types having different shapes and different areas in the cross section perpendicular to the length direction may be used.

Furthermore, in the honeycomb structural body of the present invention, the shape serving as a basic unit is repeated, and in view of the basic unit, the ratios of areas of the cross sections between the group of inlet-side through holes and the group of outlet-side through holes are different from each other. In portions closer to the periphery, there is a portion that is different from the basic unit and this portion is not conformed to the above-mentioned rule of the basic unit. Therefore, just because measurements are strictly carried out up to one or two cells on the periphery, the honeycomb structural body may be included in the present invention. In such a case, the calculations need to be carried out by excluding the one or two cells, or the calculations need to be carried out except for portions that are not repetitions of the basic units then a determination is made as to whether or not the structure is included in the present invention. More specifically, for example, as shown in FIG. 9, a honeycomb structural body, which has a structure in which all the shapes of cross sections perpendicular to the length direction of the through holes are the same except for those in the vicinity of the periphery, with either one of the ends being sealed with respect to the through holes with the same cross-sectional shape, and sealed portions and opened portions of each of the ends are placed in a staggered pattern as a whole, is determined not to be included in the honeycomb structural body of the present invention.

In the exhaust gas purifying filter, in the case where an exhaust gas purifying filter that has collected particulates to cause an increase in the pressure loss is regenerated, the particulates are burned, and in addition to carbon and the like that are burned to be eliminated, the particulates contain metal and the like that are burned to form oxides; thus, the oxides and the like are left in the exhaust gas purifying filter as ashes. Since the ashes normally remain at portions closer to the outlet of the exhaust gas purifying filter, the through holes that serve as exhaust gas purifying filters are filled with ashes starting from a portion closer to the outlet of the exhaust gas purifying filter and the volume of the portion filled with the ashes gradually increases, while the capacity (area) of a portion capable of functioning as the exhaust gas purifying filter gradually decreases. When the amount of accumulated ashes has become too much, the through holes no longer function as the filters; therefore, the resulting filters are taken out of the exhaust pipe and subjected to a back washing process to remove the ashes from the exhaust gas purifying filters, or disposed as used exhaust gas purifying filters.

In comparison with another integral honeycomb structural body in which the capacity of the group of inlet-side through holes and the capacity of the group of outlet-side through holes are the same, the integral honeycomb structural body of the present invention has a smaller ratio of reduction in the capacity (area) of the portion that functions as the exhaust gas purifying filter even after ashes have been accumulated so that the pressure loss caused by the ashes becomes smaller. Therefore, it becomes possible to prolong a period of time up to the necessity of back washing and the like, and consequently to provide a longer service life as the exhaust gas purifying filters. Thus, it becomes possible to cut maintenance costs required for back washing, exchanging members and the like.

In the integral honeycomb structural body of the present invention, particulates are accumulated uniformly not only on a partition wall commonly possessed by a through hole constituting the group of inlet-side through holes and a through hole constituting the group of outlet-side through holes that are adjacent to each other, but also on a partition wall commonly possessed by adjacently located through holes constituting the group of inlet-side through holes. The reason for this is explained as follows: since immediately after the start of collecting particulates, gases flow from the through holes constituting the group of inlet-side through holes toward the through holes constituting the group of outlet-side through holes, the particulates are accumulated on a partition wall commonly possessed by a through hole constituting the group of inlet-side through holes and a through hole constituting the group of outlet-side through holes that are adjacent to each other; however, as the particulate-collecting process progresses to form a cake layer, it becomes difficult for the gases to pass through the partition wall commonly possessed by a through hole constituting the group of inlet-side through holes and a through hole constituting the group of outlet-side through holes; thus, gas flows gradually occur also in the partition wall commonly possessed by adjacently located through holes constituting the group of inlet-side through holes. Consequently, after particulates have been collected for a certain period of time, particulates are gradually allowed to uniformly deposit on the partition wall of the through holes constituting the group of inlet-side through holes.

Therefore, when compared with a filter having no partition wall commonly possessed by through holes constituting the group of inlet-side through holes with the aperture rate being a constant value, the integral honeycomb structural body of the present invention, which has a larger surface area of partition wall used for filtering, makes it possible to reduce the thickness of particulates accumulated on each partition wall when the same amount of particulates are accumulated thereon. For this reason, the integral honeycomb structural body of the present invention makes it possible to reduce a rate of increase in the pressure loss that increases as time elapses since the start of the use, and consequently to reduce the pressure loss in view of the entire service life as the filter.

In the integral honeycomb structural body 20, the lower limit of the ratio of aperture rates (aperture rate X on inlet side/aperture rate on outlet side) is desirably set to 1.5, and the upper limit thereof is desirably set to 8.0. When the ratio of aperture rates is less than 1.5, the amount of accumulated ashes quickly becomes greater to cause an increase in pressure loss, and in order to reduce the pressure loss, the partition wall need to be made thinner; thus, the integral honeycomb structural body 20 tends to become insufficient in the strength. In contrast, when the ratio of aperture rates exceeds 8.0, the aperture rate on the outlet side becomes too small; thus, a pressure loss caused by friction when gases pass through the group of outlet-side through holes 21b tends to rise over the necessary level.

In the integral honeycomb structural body 20, although not particularly limited, the number of through holes constituting the inlet-side through holes 21a and the number of through holes constituting the outlet-side through holes 21b are desirably set to approximately the same number. With this arrangement, it is possible to minimize the number of through holes that hardly devote to filtration of exhaust gases, and consequently to prevent the pressure loss, caused by friction when gases pass through the group of inlet-side through holes and/or friction when gases pass through the group of outlet-side through holes, from rising over the necessary level. For example, in comparison with a honeycomb structural body 100 in which the numbers of through holes between the group of inlet-side through holes 101 and the group of outlet-side through holes 102 are approximately set to 1:2, as shown in FIG. 2, the structure in which the numbers of the through holes are set to approximately the same number makes it possible to reduce the pressure loss caused by friction when gases pass through the group of outlet-side through holes, and consequently to reduce the pressure loss with respect to the honeycomb structural body as a whole.

The following description will discuss specific examples of structures in the cross section perpendicular to the length direction of the honeycomb structural body of the present invention of the through holes constituting the large-capacity through holes and the through holes constituting the small-capacity through holes.

FIGS. 3(a) to 3(d) and FIGS. 4(a) to 4(f) are cross-sectional views each of which schematically shows a cross section perpendicular to the length direction in the integral honeycomb structural body of the present invention; and FIG. 3(e) is a cross-sectional view that schematically shows a cross section perpendicular to the length direction in a conventional honeycomb structural body.

In the integral honeycomb structural body 110 shown in FIG. 3(a), the ratio of aperture rates is set to about 1.55; in the integral honeycomb structural body 120 shown in FIG. 3(b), the ratio is set to about 2.54; in the integral honeycomb structural body 130 shown in FIG. 3(c), the ratio is set to about 4.45; and in the integral honeycomb structural body 140 shown in FIG. 3(d), the ratio is set to about 9.86. Moreover, in FIGS. 4(a), 4(c) and 4(e), all the ratios of aperture rates are set to approximately 4.45, and in FIGS. 4(b), 4(d) and 4(f), all the ratios of aperture rates are set to approximately 6.00.

Here, in the case where the ratio of aperture rates is great as indicated by the integral honeycomb structural body 140 of FIG. 3(d), the capacity of the small-capacity through holes 141b constituting the group of outlet-side through holes becomes too small; thus, the initial pressure loss tends to become too high.

In FIGS. 3(a) to 3(d), the cross-sectional shape of each of large-capacity through holes 111a, 121a, 131a and 141a that all constitute groups of large-capacity through holes is set to an octagonal shape, and the cross-sectional shape of each of small-capacity through holes 111b, 121b, 131b and 141b that all constitute groups of large-capacity through holes is set to a quadrangle (square) shape; and these are respectively arranged alternately so that by changing the cross-sectional area of the small-capacity through holes and also slightly changing the cross-sectional shape of the large-capacity through holes, it is possible to easily vary the ratio of aperture rates desirably. In the same manner, with respect to the integral honeycomb structural body shown in FIG. 4, it is also possible to easily vary the ratio of aperture rates desirably.

Here, in an integral honeycomb structural body 150 shown in FIG. 3(e), both of the cross-sectional shapes of inlet-side through holes 152a and outlet-side through holes 152b are square shapes, and alternately arranged respectively.

In integral honeycomb structural bodies 160 and 260 shown in FIGS. 4(a) and 4(b), the cross-sectional shapes of large-capacity through holes 161a and 261a that constitute the groups of inlet-side through holes are set to a pentagonal shape, and in this shape, three angles thereof are set to approximately right angles, and the cross-sectional shapes of small-capacity through holes 161b and 261b that constitute the groups of outlet-side through holes are set to a quadrangle shape so that these are allowed to respectively occupy portions of a larger quadrangle shape that diagonally face each other. In integral honeycomb structural bodies 170 and 270 shown in FIGS. 4(c) and 4(d) which have modified shapes of the cross-sections shown in FIGS. 3(a) to 3(d), a partition wall commonly possesed by each of large-capacity through holes 171a, 271a constituting the group of inlet-side through holes and each of small-capacity through holes 171b, 271b constituting the group of outlet-side through holes is expanded toward the small-capacity through hole side with a certain curvature. This curvature is desirably set, and the curved line constituting the partition wall may correspond to, for example, a ¼ of the circle. In this case, the above-mentioned ratio of aperture rates is 3.66. Therefore, in the integral honeycomb structural bodies 170 and 270, shown in FIGS. 4(c) to 4(d), the area of the cross section of each of the small-capacity through holes 171b and 271b is made further smaller than that of the cross section in which the curved line constituting the partition wall corresponds to a ¼ of the circle. In each of integral honeycomb structural bodies 180 and 280 shown in FIGS. 4(e) to 4(f), a large-capacity through hole 181a, 281a that belongs to the group of inlet-side through holes and a small-capacity through hole 281b, 281b that belongs to the group of outlet-side through holes, each of which has a quadrangle shape (rectangular shape), are placed adjacent to each other longitudinally so as to form a rectangular constituent unit, and these constituent units are continuously placed in the longitudinal direction, and also aligned in the lateral direction in a staggered manner.

With respect to another specific example of the structures of the through holes constituting the group of inlet-side through holes and the group of outlet-side through holes in the cross-sectional face perpendicular to the length direction of the honeycomb structural body of the present invention, for example, an integral honeycomb structural body 190 shown in FIG. 5, which has large-capacity through holes 191*a* constituting the group of inlet-side through holes and small-capacity through holes 191*b* constituting the group of outlet-side through holes, is proposed, and other integral honeycomb structural bodies 200, 21, 220, 230 shown in FIG. 6(*a*) to 6(*d*), each of which has large-capacity through holes, 201*a*, 211*a*, 221*a*, 231*a* constituting the group of inlet-side through holes and small-capacity through holes, 201*b*, 211*b*, 221*b*, 231*b* constituting the group of outlet-side through holes, are also proposed.

Moreover, the integral honeycomb structural body 20 may have a catalyst capable of purifying CO, HC, NOx and the like in the exhaust gases deposited therein.

When such a catalyst is supported therein, the integral honeycomb structural body 20 is allowed to function as a filter capable of collecting particulates in exhaust gases, and also to function as a catalyst converter for purifying CO, HC, NOx and the like contained in exhaust gases.

With respect to the catalyst to be supported in the integral honeycomb structural body 20, not particularly limited as long as it can purify CO, HC, NOx and the like contained in exhaust gases, examples thereof include noble metals such as platinum, palladium, rhodium and the like. Among these, a so-called three-way catalyst, made of platinum, palladium and rhodium, is desirably used. Moreover, in addition to the noble metal, an element, such as an alkali metal (Group 1 in Element Periodic Table), an alkali earth metal (Group 2 in Element Periodic Table), a rare-earth element (Group 3 in Element Periodic Table) and a transition metal element, may be added thereto as a co-catalyst.

The above-mentioned catalyst may be supported on the surface of each of pores in the integral honeycomb structural body 20, or may be supported on the surface of each of the partition wall 23 with a certain thickness. Moreover, the above-mentioned catalyst may be supported on the surface of each of the partition wall 23 and/or the surface of each of pores evenly, or may be supported on a certain fixed place thereof in a biased manner. Among these places, the catalyst is more desirably supported on the surface of each of the partition wall 23 or the surface of each of pores in the vicinity of the surface inside the through holes 21 that constitute a group of inlet-side through holes, and the catalyst is most desirably supported on both of these places. This arrangement easily makes the catalyst and particulates in contact with each other, thereby making it possible to carry out the burning process of particulates effectively.

Moreover, upon applying the catalyst to the integral honeycomb structural body 20, it is desirable to apply the catalyst after the surface of the integral honeycomb structural body has been coated with a support member such as alumina. With this arrangement, the specific surface area is made greater so that the degree of dispersion of the catalyst is improved and the reaction sites of the catalyst are increased. Since it is possible to prevent sintering of the catalyst metal by the support member, the heat resistance of the catalyst is also improved. In addition, it becomes possible to reduce the pressure loss.

The integral honeycomb structural body of the present invention that is provided with the above-mentioned catalyst is allowed to function as a gas-purifying device in the same manner as conventionally known DPFs (Diesel Particulate Filters) with a catalyst. Therefore, with respect to the case in which the integral honeycomb structural body of the present invention also functions as a catalyst-supporting member, detailed description thereof is omitted.

An integral honeycomb structural body of the present invention may be used as an integral-type filter as a single body, however, more desirably, a plurality of them may be combined with one another through sealing material layer, and used as an aggregated-type filer. The aggregated-type filter makes it possible to reduce a thermal stress by the sealing material layer to improve the heat resistance of the filter, and since the number of the integral honeycomb structural bodies can be increased or reduced, it becomes possible to freely adjust the size and the like of the device.

Here, both of the integral-type filter and the aggregated-type filter have the same functions.

In the integral-type filter formed by the integral honeycomb structural body of the present invention, normally, an oxide ceramic material such as cordierite is normally used as a material thereof. This is because, this material makes it possible to cut manufacturing costs, and since this material has a comparatively small coefficient of thermal expansion, it is possible to make the honeycomb structural body less likely to be damaged due to a thermal stress that is exerted during production as well as during use.

In the integral-type filter formed by the integral honeycomb structural body of the present invention, although not shown in FIG. 1, a sealing material layer, made of a material that hardly transmits gases in comparison with the integral honeycomb structural body of the present invention, is desirably formed on the circumferential face thereof. In the case where the sealing material layer is formed on the circumferential face, the integral honeycomb structural body of the present invention is compressed by the sealing material layer so that it is possible to increase the strength, and also to prevent isolation of ceramic particles due to occurrence of cracks.

The aggregated honeycomb structural body of the present invention is manufactured by forming a sealing material layer on the circumferential face of a honeycomb block in which a plurality of integral honeycomb structural bodies of the present invention are combined through a sealing material layer with one another, and functions as an aggregated-type filter.

FIG. 7 is a perspective view that schematically shows one example of the aggregated honeycomb structural body of the present invention. In the aggregated honeycomb structural body shown in FIG. 7, a number of through holes are constituted by a group of inlet-side through holes with each of the ends on the outlet side being sealed with a plug such that the total area of the cross sections perpendicular to the length direction being made relatively greater, and a group of outlet-side through holes with each of the ends on the inlet side being sealed with the plug such that the total area of the above-mentioned cross sections being made relatively smaller.

As shown in FIG. 7, the aggregated honeycomb structural body 10, which is used as an exhaust gas purifying filter, has a structure in which a plurality of the integral honeycomb structural members 20 are combined with one another through sealing material layer 14 to form a honeycomb block 15, with a sealing material layer 13 for preventing leakage of exhaust gases being formed on the periphery of the honeycomb block 15.

Here, in the aggregated honeycomb structural body 10, silicon carbide, which is superior in thermal conductivity, heat resistance, mechanical properties and chemical resistance, is desirably used as a material for constituting the integral honeycomb structural body 20.

In the aggregated honeycomb structural body 10, the sealing material layer 14 is formed between the integral ceramic structural bodies 20, and serves as a bonding agent that bonds the integral ceramic structural bodies 20 to one another, and the sealing material layer 13, on the other hand, which is formed on the circumferential face of the honeycomb block 15, serves as a sealing material that prevents exhaust gases that flow through the through holes from leaking from the circumferential face of the honeycomb block 15, when the aggregated honeycomb structural body 10 is placed in an exhaust passage in an internal combustion engine.

Here, in the aggregated honeycomb structural body 10, the sealing material layer 13 and the sealing material layer 14 may be made of the same material, or may be made of different materials. In the case where the sealing material layer 13 and the sealing material layer 14 are made of the same material, the blending ratio of the materials may be the same or different from each other.

The sealing material layer 14 may be made of a dense material or may be made of a porous material so as to allow exhaust gases to flow therein; however, the sealing material layer 13 is desirably made of a dense material. This is because the sealing material layer 13 is formed so as to prevent leak of exhaust gases from the circumferential face of the ceramic block 15 when the aggregated honeycomb structural body 10 is placed in an exhaust passage of an internal combustion engine.

With respect to the material for forming the sealing material layer 13 and the sealing material layer 14, not particularly limited, examples thereof include an inorganic binder, an organic binder and a material made of inorganic fibers and/or inorganic particles.

With respect to the inorganic binder, for example, silica sol, alumina sol and the like may be used. Each of these may be used alone or two or more kinds of these may be used in combination. Among the inorganic binders, silica sol is more desirably used.

With respect to the organic binder, examples thereof include polyvinyl alcohol, methyl cellulose, ethyl cellulose, carboxymethyl cellulose and the like. Each of these may be used alone or two or more kinds of these may be used in combination. Among the organic binders, carboxymethyl cellulose is more desirably used.

With respect to the inorganic fibers, examples thereof include ceramic fibers such as silica-alumina, mullite, alumina, silica and the like. Each of these may be used alone or two or more kinds of these may be used in combination. Among the inorganic fibers, silica-alumina fibers are more desirably used.

With respect to the inorganic particles, examples thereof include carbides, nitrides and the like, and specific examples include inorganic powder or whiskers made of silicon carbide, silicon nitride, boron nitride and the like. Each of these may be used alone, or two or more kinds of these may be used in combination. Among the inorganic fine particles, silicon carbide having a superior thermal conductivity is desirably used.

In the case where the integral honeycomb structural body of the present invention, as it is, is used as an exhaust gas purifying filter as described above, the sealing material layer that is the same as that of the aggregated honeycomb structural body of the present invention may be formed on the circumferential face of the integral honeycomb structural body of the present invention.

The aggregated honeycomb structural body 10 shown in FIG. 7 has a cylindrical shape; however, the shape of the aggregated honeycomb structural body of the present invention is not particularly limited as long as it is a pillar-shaped body and may be formed into, for example, a pillar-shape which has a cross-sectional shape perpendicular to the length direction such as a polygonal shape, an elliptical shape and the like.

The aggregated honeycomb structural body of the present invention may be manufactured by processes in which, after a plurality of integral honeycomb structural bodies of the present invention have been combined with one another, the peripheral portion thereof is machined so as to form the cross section perpendicular to the length direction into a shape such as a polygonal shape, a circular shape or an elliptical shape, or processes in which, after the cross-sections of the integral honeycomb structural bodies of the present invention have been preliminarily machined, the resulting structural bodies are combined with one another by using a sealing material so as to form the cross section perpendicular to the length direction into a shape such as a polygonal shape, a circular shape or an elliptical shape; that is, for example, four pillar-shaped integral honeycomb structural bodies of the present invention, each having an arc shape in its cross section perpendicular to the length direction that is one of four equally divided portions of a circle, may be combined with one another to manufacture a pillar-shaped aggregated honeycomb structural body of the present invention.

Next, the following description will discuss one example of a manufacturing method for the above-mentioned honeycomb structural body of the present invention.

In the case where the honeycomb structural body of the present invention is an integral-type filter in which the entire structure is made of a single sintered body, first, an extrusion-molding process is carried out by using the material paste mainly composed of the above-mentioned ceramics so that a ceramic molded body having approximately the same shape as the integral honeycomb structural body of the present invention is manufactured. In this case, metal molds that are used for extrusion-molding two types of through holes, that is, for example, large-capacity through holes and small-capacity through holes, are prepared according to the densities of the through holes.

With respect to the material paste, not particularly limited, any material paste may be used as long as the porosity of the integral honeycomb structural body after the manufacturing process is set in a range from 20 to 80%, and, for example, a material paste, prepared by adding a binder and a dispersant solution to powder made of the above-mentioned ceramics, may be used.

With respect to the above-mentioned binder, not particularly limited, examples thereof include methylcellulose, carboxy methylcellulose, hydroxy ethylcellulose, polyethylene glycol, phenol resins, epoxy resins and the like.

Normally, the blend ratio of the above-mentioned binder is desirably set to 1 to 10 parts by weight to 100 parts by weight of ceramic powder.

With respect to the above-mentioned dispersant solution, not particularly limited, for example, an organic solvent such as benzene, alcohol such as methanol, water and the like may be used.

An appropriate amount of the above-mentioned dispersant solution is blended so that the viscosity of the material paste is set in a predetermined range.

These ceramic powder, binder and dispersant solution are mixed by an attritor or the like, and sufficiently kneaded by a kneader or the like, and then extrusion-molded.

Moreover, a molding auxiliary may be added to the above-mentioned material paste, if necessary.

With respect to the molding auxiliary, not particularly limited, examples thereof include: ethylene glycol, dextrin, fatty acid soap, polyalcohol and the like.

Furthermore, a pore-forming agent, such as balloons that are fine hollow spheres composed of oxide-based ceramics, spherical acrylic particles and graphite, may be added to the above-mentioned material paste, if necessary.

With respect to the above-mentioned balloons, not particularly limited, for example, alumina balloons, glass microballoons, shirasu balloons, fly ash balloons (FA balloons), mullite balloons and the like may be used. Among these, fly ash balloons are more desirably used.

Next, the above-mentioned ceramic molded body is dried by using a dryer such as a micro-wave dryer, a hot-air dryer, a dielectric dryer, a decompression dryer, a vacuum dryer, a freeze dryer and the like, to form a ceramic dried body. Next, a predetermined amount of sealing material paste (plug), which will form plugs, is injected into ends on the outlet side of the group of the inlet-side through holes and ends on the inlet side of the group of the outlet-side through holes in a manner so as to satisfy the above-mentioned equation (1); thus, the through holes are sealed.

With respect to the above-mentioned sealing material paste (plug), not particularly limited as long as the porosity of a plug manufactured through post-processes is set in a range from 20 to 80%, for example, the same material paste as described above may be used; however, those pastes, prepared by adding ceramic fibers, powder made of the above-mentioned metal, a lubricant, a solvent, a dispersant and a binder to ceramic powder used as the above-mentioned material paste, are desirably used. With this arrangement, it becomes possible to adjust the thermal capacity of the plug manufactured through the post-processes and also to prevent ceramics particles in the sealing material paste (plug) from settling in the middle of the sealing process.

With respect to the ceramic fibers, not particularly limited, examples thereof include fibers made of silica-alumina, mullite, alumina, silica and the like. Each of these may be used alone or two or more kinds of these may be used in combination.

Next, the ceramic dried body filled with the sealing material paste (plug) is subjected to degreasing and sintering processes under predetermined conditions to manufacture an integral honeycomb structural body of the present invention that is made of porous ceramics, and formed as a single sintered body as a whole.

Here, with respect to the degreasing and sintering conditions and the like of the ceramic dried body, it is possible to apply conditions that have been conventionally used for manufacturing a filter made of porous ceramics.

In the case where a catalyst is supported on the integral honeycomb structural body of the present invention, it is desirable to form an alumina film having a high specific surface area on the surface of the ceramic sintered body obtained through the sintering process and to apply a co-catalyst and a catalyst such as platinum onto the surface of this alumina film.

With respect to the method for forming the alumina film on the surface of the ceramic sintered body, a method in which the ceramic sintered body is impregnated with a solution of a metal compound containing aluminum such as $Al(NO_3)_3$ and then heated and a method in which the ceramic sintered body is impregnated with a solution containing alumina powder and then heated are proposed.

With respect to the method for applying a co-catalyst to the alumina film, for example, a method in which the ceramic sintered body is impregnated with a solution of a metal compound containing a rare-earth element, such as $Ce(NO_3)_3$, and then heated is proposed.

With respect to the method for applying a catalyst to the alumina film, for example, a method in which the ceramic sintered body is impregnated with a solution of diammine dinitro platinum nitric acid ($[Pt(NH_3)_2(NO_2)_2]HNO_3$ having a platinum concentration of 4.53% by weight) and then heated is proposed.

Moreover, in the case where the honeycomb structural body of the present invention is prepared as an aggregated honeycomb structural body 10 which is constituted by a plurality of integral honeycomb structural bodies 20 combined with each other through sealing material layer 14 as shown in FIG. 7, a sealing material paste layer 81 is formed by applying a sealing material paste to form a sealing material layer 14 onto a side face of the integral honeycomb structural body 20 with an even thickness, and processes for laminating another integral honeycomb structural body 20 are repeated successively to form a laminated body of a square-pillar-shaped integral honeycomb structural body 20 having a predetermined size on this sealing material paste layer 81. Here, with respect to the material for forming the sealing material paste, the description thereof is omitted since the description has already been given.

Next, the laminated body of the integral honeycomb structural body 20 is heated so that the sealing material paste layer 81 is dried and solidified to form the sealing material layer 14, and the peripheral portion thereof is then cut into a shape as shown in FIG. 7 to manufacture a honeycomb block 15.

Then, a sealing material layer 13 is formed on the peripheral portion of the honeycomb block 15 by using the sealing material paste to manufacture the aggregated filter 10 of the present invention, which has a structure in which a plurality of integral honeycomb structural bodies 20 are combined with one another through sealing material layer 14.

Although not particularly limited, the honeycomb structural body of the present invention is desirably applied to an exhaust gas purifying device for use in vehicles.

FIG. 8 is a cross-sectional view that schematically shows one example of an exhaust gas purifying device of a vehicle in which the honeycomb structural body of the present invention is placed.

As shown in FIG. 8, an exhaust gas purifying device 600 is mainly constituted by a honeycomb structural body 60 of the present invention, a casing 630 that covers the external portion of the honeycomb structural body 60, a holding sealing material 620 that is placed between the honeycomb structural body 60 and the casing 630 and a heating means 610 placed on the exhaust gas inlet side of the honeycomb structural body 60, and an introducing pipe 640, which is connected to an internal combustion system such as an engine, is connected to one end of the casing 630 on the exhaust gas inlet side, and an exhaust pipe 650 externally coupled is connected to the other end of the casing 630. In FIG. 8, arrows show flows of exhaust gases.

Moreover, in FIG. 8, the honeycomb structural body 60 may be prepared as the integral honeycomb structural body 20 shown in FIG. 1 or as the aggregated honeycomb structural body 10 shown in FIG. 7.

In the exhaust gas purifying device 600 having the above-mentioned arrangement, exhaust gases, discharged from the internal-combustion system such as an engine, are introduced into the casing 630 through the introducing pipe 640, and allowed to flow into the honeycomb structural body 60 through a group of inlet-side through holes 21a and to pass through partition wall 23; thus, the exhaust gases are purified, with particulates thereof being collected in the partition wall 23, and are then discharged outside the honeycomb structural body 60 from a group of outlet-side through holes 21b, and externally discharged through the exhaust pipe 650.

In the exhaust gas purifying device 600, after a large quantity of particulates have been accumulated on the partition wall of the honeycomb structural body 60 to cause an increase in pressure loss, the honeycomb structural body 60 is subjected to a regenerating process.

In the regenerating process, gases, heated by using a heating means 610, are allowed to flow into the through holes of the honeycomb structural body 60 so that the honeycomb structural body 60 is heated to burn and eliminate the particulates deposited on the partition wall. In addition to the above-mentioned method, the particulates may be burned and eliminated by using a post-injection system.

EXAMPLES

Referring to FIGS. 1, 3 and 7, the following description will discuss the present invention in detail by means of examples; however, the present invention is not intended to be limited by these examples.

Example 1

Powder of α-type silicon carbide having an average particle size of 10 μm (60% by weight) and powder of β-type silicon carbide having an average particle size of 0.5 μm (40% by weight) were wet-mixed, and to 100 parts by weight of the resulting mixture were added and kneaded 5 parts by weight of an organic binder (methyl cellulose) and 10 parts by weight of water to prepare a mixed composition. Next, after a slight amount of a plasticizer and a lubricant had been added and kneaded therein, the resulting mixture was extrusion-molded so that a raw molded product having a cross-sectional shape that was approximately the same cross-sectional shape shown in FIG. 3(a), with an aperture rate on the inlet side of 37.97% and a ratio of aperture rates of 1.52, was manufactured.

Next, after the above-mentioned raw molded product had been dried by using a micro-wave drier or the like to form a ceramic dried body, predetermined through holes were filled with a sealing material paste (plug) having the same composition as the raw molded product so as to form a layer having a thickness of 1.0 mm after having been dried.

After having been again dried by using a drier, the resulting product was degreased at 400° C., and sintered at 2200° C. in a normal-pressure argon atmosphere for 3 hours to manufacture an integral honeycomb structural body 20, which was a silicon carbide sintered body, and had a porosity of 42%, an average pore diameter of 9 μm, a size of 34.3 mm×34.3 mm×150 mm, the number of through holes 21 of 28/cm² (large-capacity through holes 21a: 14 pcs/cm², small-capacity through holes 21b: 14 pcs/cm²) and a thickness of approximately all the partition wall 23 of 0.40 mm.

Here, in the integral honeycomb structural body 20, only the large-capacity through holes 21a were sealed by plugs on the end face on the outlet side, and only the small-capacity through holes 21b were sealed with the plugs on the end face on the inlet side. Moreover, the total sum of thermal capacities of the plugs 22 on the outlet side measured at 25° C. per 11.8 cm² of the end face on the outlet side constituted by containing the group of the through holes on the outlet side was 0.56 J/K, and the total sum of thermal capacities of the plugs 22 on the outlet side measured at 500° C. per 11.8 cm² of the end face on the outlet side constituted by containing the group of the through holes on the outlet side was 0.91 J/K.

By using a heat resistant sealing material paste containing 30% by weight of alumina fibers having a fiber length of 0.2 mm, 21% by weight of silicon carbide particles having an average particle size of 0.6 μm, 15% by weight of silica sol, 5.6% by weight of carboxymethyl cellulose and 28.4% by weight of water, a large number of the integral honeycomb structural bodies 20 were combined with one another by using the method explained by reference to FIG. 8, and this was then cut by using a diamond cutter to form a cylindrical ceramic block 15.

In this case, the thickness of the sealing material layer used for combining the integral honeycomb structural bodies 20 was adjusted to 1.0 mm.

Next, ceramic fibers made of alumina silicate (shot content: 3%, fiber length: 0.01 to 100 mm) (23.3% by weight), which served as inorganic fibers, silicon carbide powder having an average particle size of 0.3 μm (30.2% by weight), which served as inorganic particles, silica sol ($SiO_2$ content in the sol: 30% by weight) (7% by weight), which served as an inorganic binder, carboxymethyl cellulose (0.5% by weight), which served as an organic binder, and water (39% by weight) were mixed and kneaded to prepare a sealing material paste.

Next, a sealing material paste layer having a thickness of 0.2 mm was formed on the circumferential portion of the ceramic block 15 by using the above-mentioned sealing material paste. Further, this sealing material paste layer was dried at 120° C. so that a cylindrical honeycomb structural body 10 having a diameter of 143.8 mm and a length of 150 mm was manufactured.

Examples 2 to 24, Comparative Examples 1 to 8

The same processes as those of Example 1 were carried out except that the cross-sectional shape (inlet-side aperture rate, ratio of aperture rates) perpendicular to the length direction of the integral honeycomb structural body 20 and the thickness of the plugs 22 were changed as indicated by Table 1 to manufacture an integral honeycomb structural body 10.

Here, the cross-sectional shape in the length direction of the integral honeycomb structural body 20 was adjusted by changing the shape of a die used for extrusion-molding the mixture composition. Moreover, the thickness of the plugs 22 was adjusted by changing the filling amount of the sealing material paste (plug) to the through holes 21.

(Evaluation)

As shown in FIG. 8, each of the aggregated honeycomb structural bodies of the examples and comparative examples was placed in an exhaust passage of an engine to form an exhaust gas purifying device, and the engine was driven at the number of revolutions of 3000 $min^{-1}$ and a torque of 50 Nm for a predetermined period of time, and the resulting honeycomb structural body was then subjected to a regenerating process; and these processes were continuously carried out while the driving time was changed with the amount of collection being varied so as to examine whether or not any cracks would occur in the aggregated honeycomb structural body. Then, based upon the amounts of particulates that had been collected upon occurrence of cracks and that had been collected without occurrence of cracks, the maximum value of the amount of particulates collected without causing cracks was defined as the regenerating limit value.

More specifically, each of filters made by the aggregated honeycomb structural bodies according to examples and comparative examples was placed in an exhaust passage in a 2 L direct-injection engine and an oxide catalyst made of cordierite (φ5.66×3 inch, number of cells 400 cpsi, wall thickness 8 mil, Pt amount 90 g/$ft^3$) was placed adjacent thereto so that an exhaust gas purifying device was prepared, and the engine was driven at the number of revolutions of 3000 min$^{-1}$ and a torque of 50 Nm for a predetermined period of time so that a predetermined amount of particulates were collected. Thereafter, the engine was driven at the number of revolutions of 4000 min$^{-1}$ with a torque of 200 Nm and when the filter temperature had become constant in the vicinity of 700° C., the engine was maintained at the number of revolutions of 1050 min$^{-1}$ with a torque of 30 Nm so that the particulates collected were forcefully burned. This regenerating-process experiment was carried out in the same manner on several filters with the amount of collection of particulates being changed so as to examine whether or not any cracks would occur.

The results are shown in Table 1.

TABLE 1

| | Honeycomb structural body cross-sectional shape | Inlet-side aperture rate X(%) | Ratio of aperture rates | Partition wall thickness (mm) | Thickness of plug (mm) | 0.0157X-0.0678 to 1.15X-5 | 0.05X to 0.574X-2 |
|---|---|---|---|---|---|---|---|
| Comparative Example 1 | FIG. 3(a) | 37.97 | 1.52 | 0.40 | 0.5 | 0.53 to 38.67 | 1.90 to 19.79 |
| Example 1 | | | | | 1.0 | | |
| Example 2 | | | | | 3.0 | | |
| Example 3 | | | | | 6.0 | | |
| Example 4 | | | | | 10.0 | | |
| Example 5 | | | | | 20.0 | | |
| Example 6 | | | | | 40.0 | | |
| Comparative Example 2 | | | | | 60.0 | | |
| Comparative Example 3 | FIG. 3(b) | 44.79 | 2.33 | 0.40 | 0.5 | 0.64 to 46.51 | 2.24 to 23.71 |
| Example 7 | | | | | 1.0 | | |
| Example 8 | | | | | 3.0 | | |
| Example 9 | | | | | 6.0 | | |
| Example 10 | | | | | 10.0 | | |
| Example 11 | | | | | 20.0 | | |
| Example 12 | | | | | 40.0 | | |
| Comparative Example 4 | | | | | 60.0 | | |
| Comparative Example 5 | FIG. 3(c) | 51.77 | 3.88 | 0.40 | 0.5 | 0.74 to 54.54 | 2.59 to 27.72 |
| Example 13 | | | | | 1.0 | | |
| Example 14 | | | | | 3.0 | | |
| Example 15 | | | | | 6.0 | | |
| Example 16 | | | | | 10.0 | | |
| Example 17 | | | | | 20.0 | | |
| Example 18 | | | | | 40.0 | | |
| Comparative Example 6 | | | | | 60.0 | | |
| Comparative Example 7 | FIG. 3(d) | 59.04 | 7.89 | 0.40 | 0.5 | 0.86 to 62.90 | 2.95 to 31.89 |
| Example 19 | | | | | 1.0 | | |
| Example 20 | | | | | 3.0 | | |
| Example 21 | | | | | 6.0 | | |
| Example 22 | | | | | 10.0 | | |
| Example 23 | | | | | 20.0 | | |
| Example 24 | | | | | 40.0 | | |
| Comparative Example 8 | | | | | 60.0 | | |

| | Total thermal capacity Y of outlet-side plug (J/K at 500° C.) | 0.013X-0.09 to 0.7X-2.5 | 0.05X-0.55 to 0.354X-1 | Total thermal capacity Z of outlet-side plug (J/K at 25° C.) | Regenerating limit value (g/L) |
|---|---|---|---|---|---|
| Comparative Example 1 | 0.44 | 0.40 to 24.08 | 1.35 to 12.44 | 0.27 | 6.9 |
| Example 1 | 0.91 | | | 0.56 | 7.8 |
| Example 2 | 2.83 | | | 1.74 | 8.4 |
| Example 3 | 5.64 | | | 3.47 | 8.6 |
| Example 4 | 9.42 | | | 5.80 | 8.6 |
| Example 5 | 18.86 | | | 11.62 | 8.5 |
| Example 6 | 37.69 | | | 23.22 | 7.8 |
| Comparative Example 2 | 56.52 | | | 34.82 | 6.4 |
| Comparative Example 3 | 0.56 | 0.49 to 28.85 | 1.69 to 14.86 | 0.34 | 6.9 |
| Example 7 | 1.11 | | | 0.68 | 8 |
| Example 8 | 3.39 | | | 2.09 | 8.9 |
| Example 9 | 6.75 | | | 4.18 | 9.5 |
| Example 10 | 11.30 | | | 6.96 | 9.4 |
| Example 11 | 22.59 | | | 13.92 | 9.2 |
| Example 12 | 45.18 | | | 27.83 | 7.9 |

TABLE 1-continued

| | | | | | |
|---|---|---|---|---|---|
| Comparative Example 4 | 67.76 | | | 41.74 | 6.6 |
| Comparative Example 5 | 0.69 | 0.58 to 33.74 | 2.04 to 17.33 | 0.42 | 6.7 |
| Example 13 | 1.31 | | | 0.81 | 7.6 |
| Example 14 | 3.99 | | | 2.46 | 8.3 |
| Example 15 | 7.99 | | | 4.92 | 8.7 |
| Example 16 | 13.24 | | | 8.16 | 8.6 |
| Example 17 | 26.80 | | | 16.39 | 8.3 |
| Example 18 | 53.14 | | | 32.74 | 7.7 |
| Comparative Example 6 | 79.68 | | | 49.09 | 6.7 |
| Comparative Example 7 | 0.73 | 0.68 to 38.83 | 2.40 to 19.90 | 0.45 | 6.3 |
| Example 19 | 1.53 | | | 0.94 | 7.3 |
| Example 20 | 4.64 | | | 2.86 | 8.1 |
| Example 21 | 9.26 | | | 5.72 | 8.5 |
| Example 22 | 15.44 | | | 9.51 | 8.4 |
| Example 23 | 30.95 | | | 19.07 | 8.2 |
| Example 24 | 61.86 | | | 38.11 | 7.8 |
| Comparative Example 8 | 92.87 | | | 57.22 | 6.9 |

As shown in Table 1, the aggregated honeycomb structural bodies according to the examples that satisfied the above-mentioned inequalities (1) and (2) had high regenerating limit values. In contrast, the aggregated honeycomb structural bodies according to the comparative examples that failed to satisfy the above-mentioned inequalities (1) and (2) were more likely to generate cracks in the outlet-side sealing portions during the regenerating process, and had low regenerating limit values.

Figure 1:
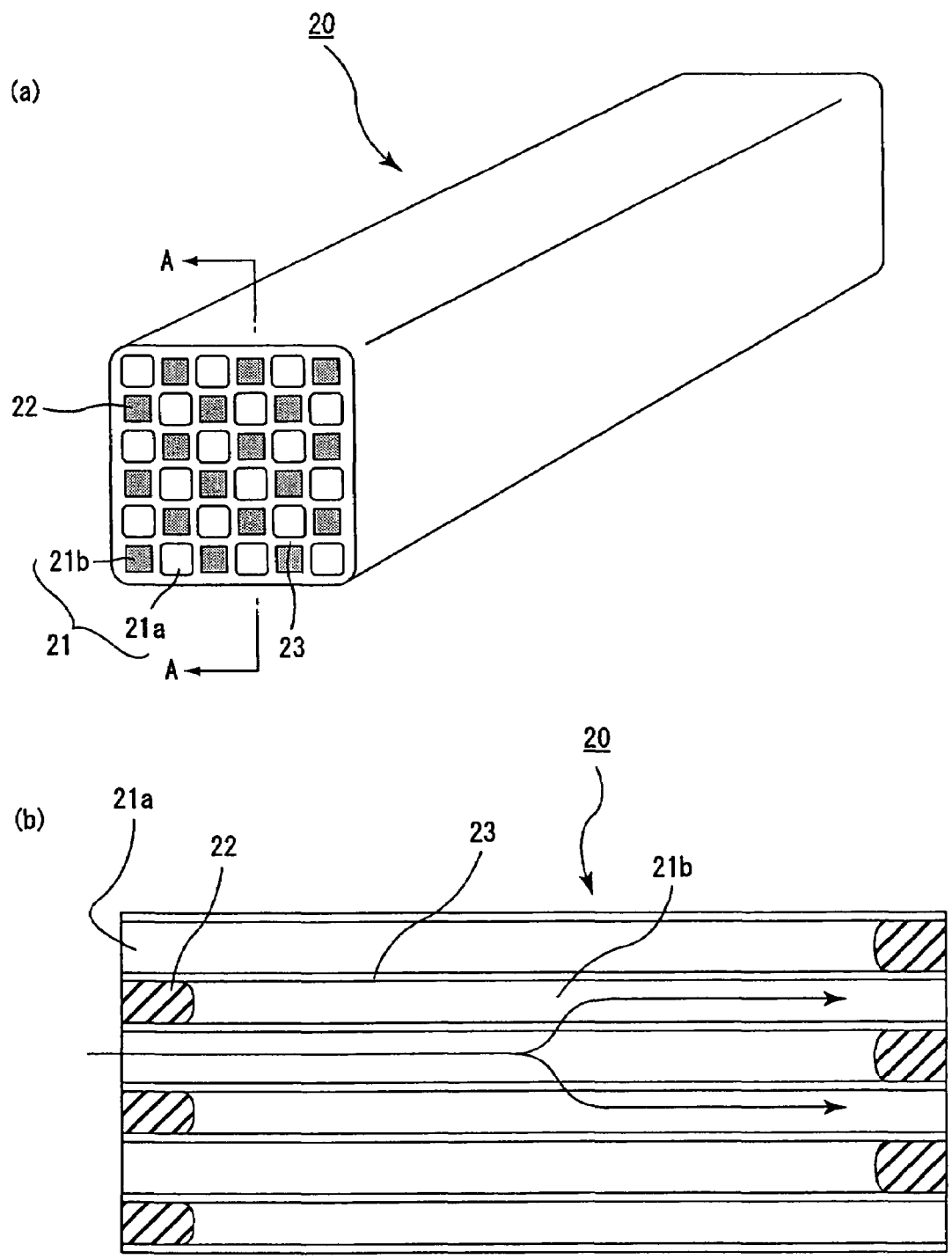
FIG. 1($a$) is a perspective view that schematically shows one example of an integral honeycomb structural body of the present invention, and FIG. 1($b$) is a cross-sectional view taken along line A-A of the integral honeycomb structural body of the present invention shown in FIG. 1($a$).
Figure 2:
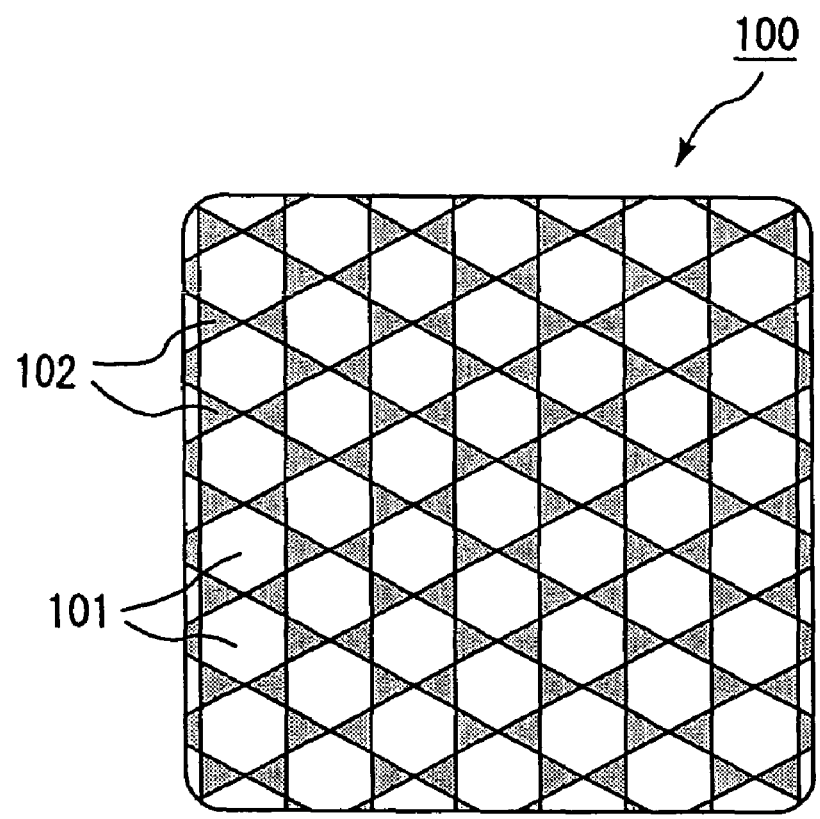
FIG. 2 is a cross-sectional view that schematically shows a cross section perpendicular to the length direction of a honeycomb structural body of the present invention in which the ratio of the numbers of through holes between a group of inlet-side through holes 101 and a group of outlet-side through holes 102 are approximately set to 1:2.
Figure 3:
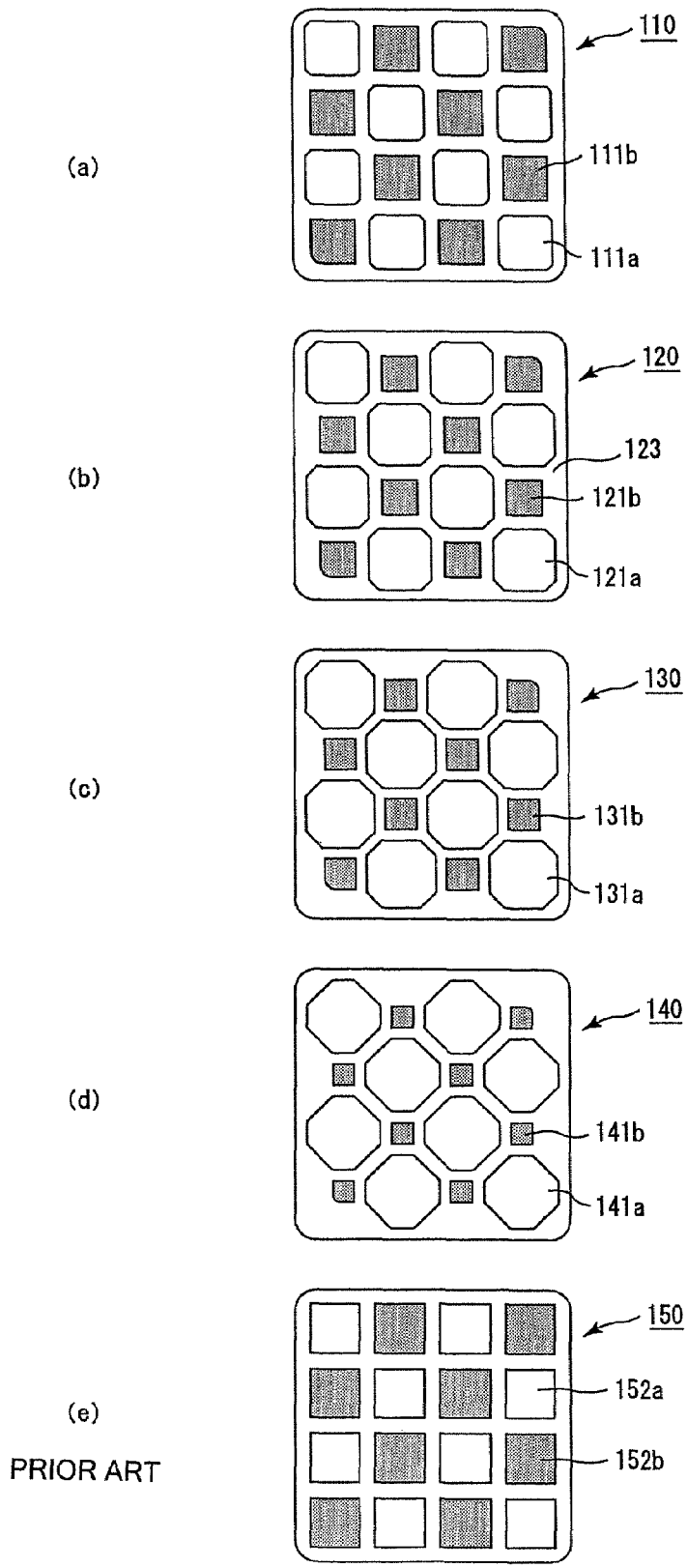
FIGS. 3($a$) to 3($d$) are cross-sectional views each of which schematically shows a cross section perpendicular to the length direction of an integral honeycomb structural body of the present invention, and FIG. 3($e$) is a cross-sectional view that schematically shows a cross section perpendicular to the length direction of a conventional integral honeycomb structural body.
Figure 4:
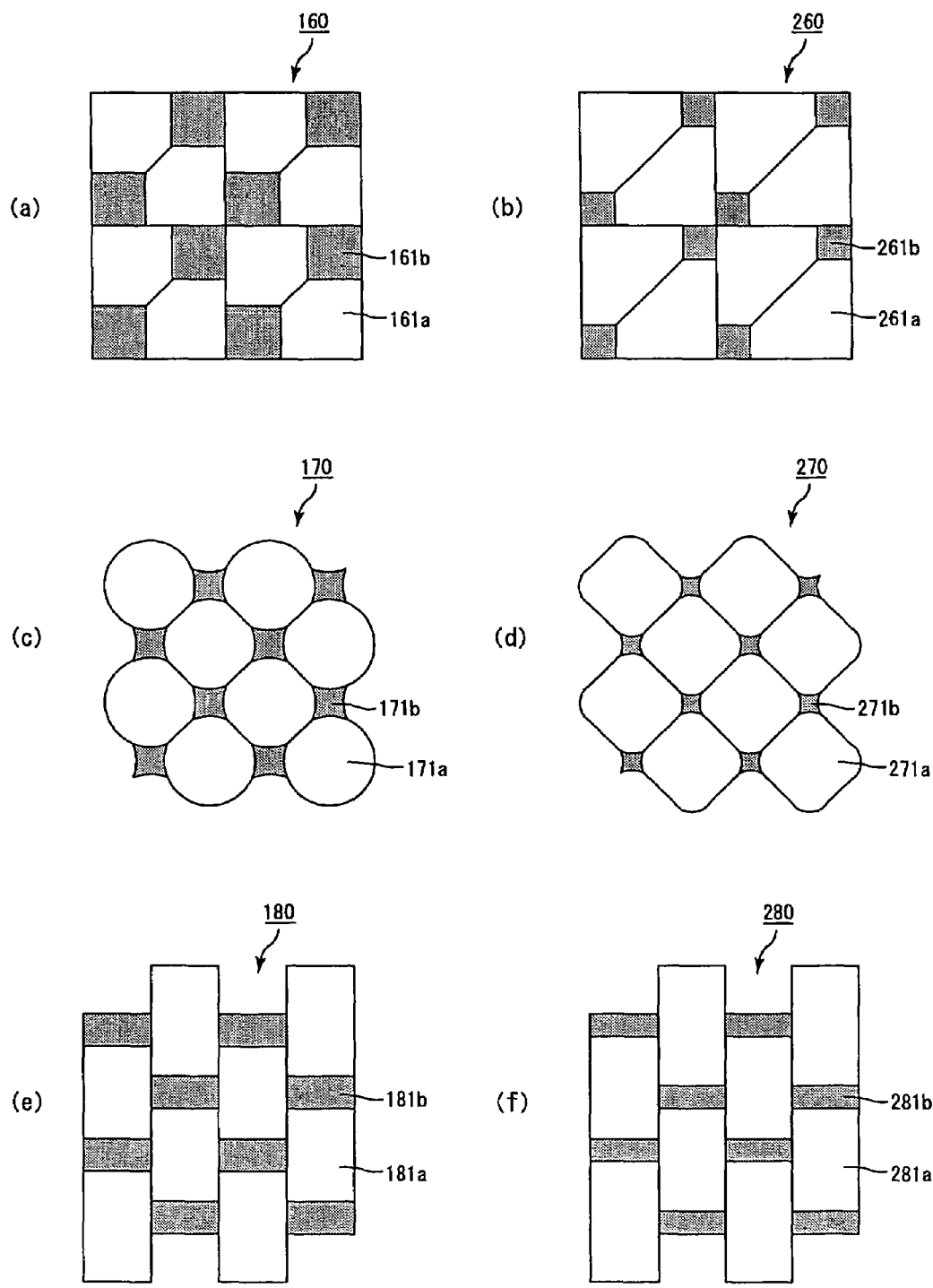
FIGS. 4($a$) to 4($f$) are cross-sectional views each of which schematically shows one portion of a cross section perpendicular to the length direction of an integral honeycomb structural body of the present invention.
Figure 5:
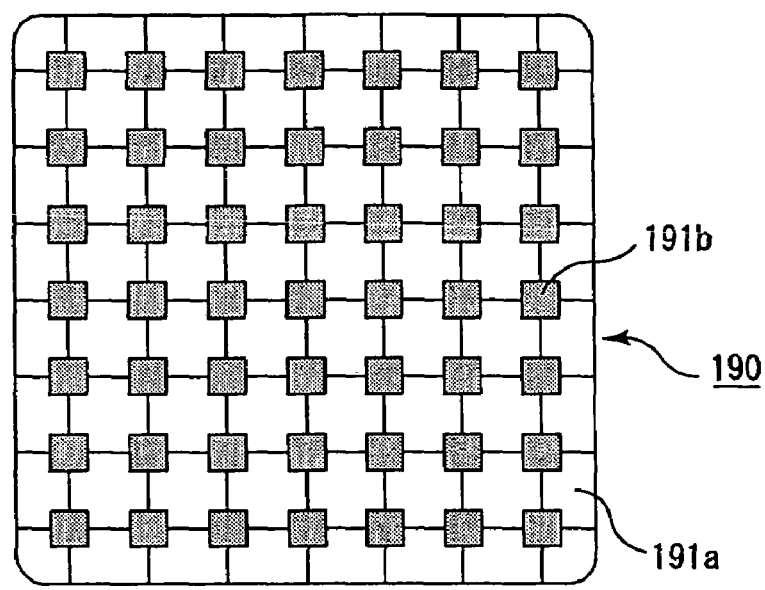
FIG. 5 is a cross-sectional view that schematically shows one example of a cross section perpendicular to the length direction of an integral honeycomb structural body of the present invention.
Figure 6:
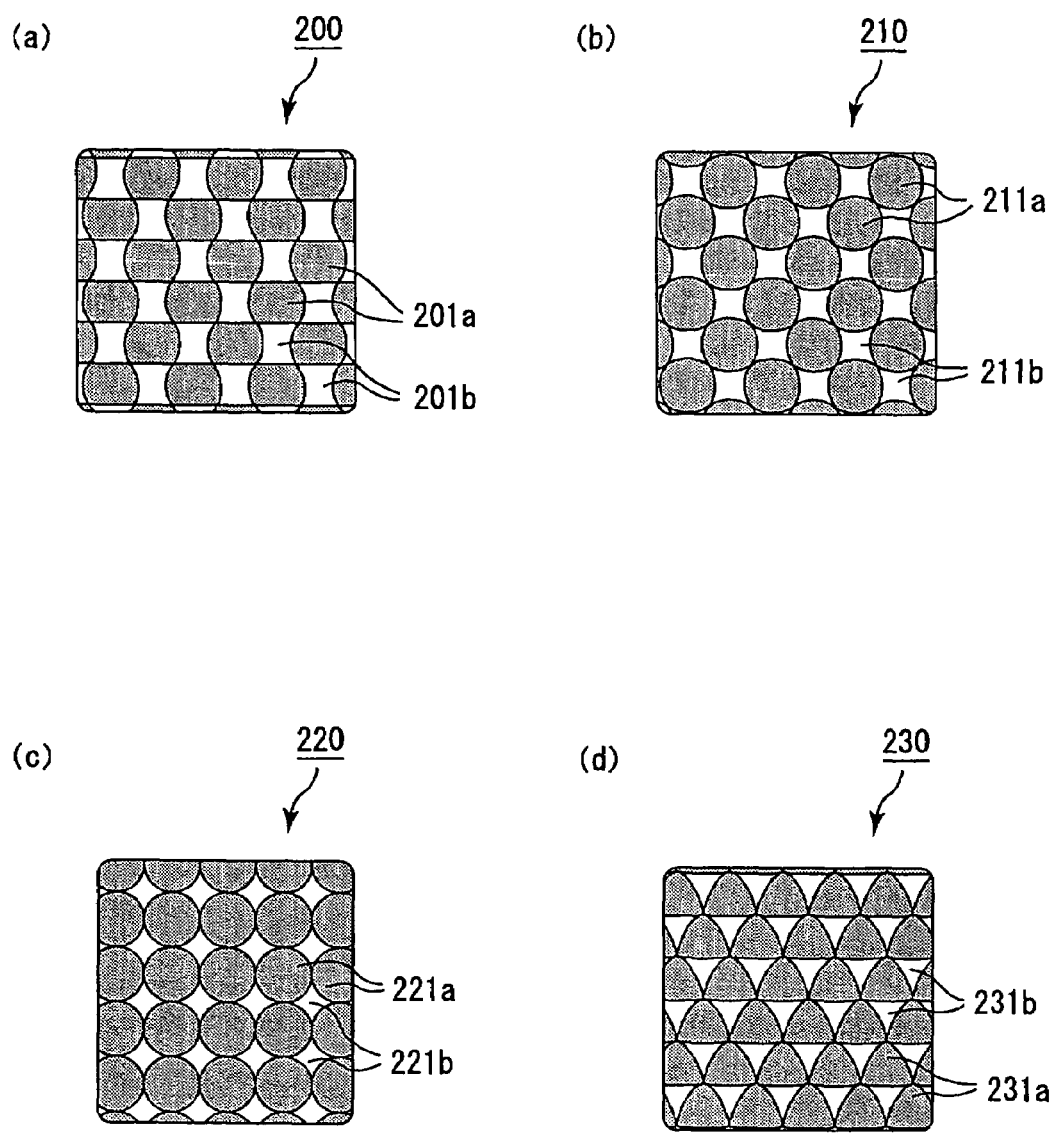
FIGS. 6($a$) to 6($d$) are cross-sectional views each of which schematically shows one example of a cross section perpendicular to the length direction of an integral honeycomb structural body of the present invention.
Figure 7:
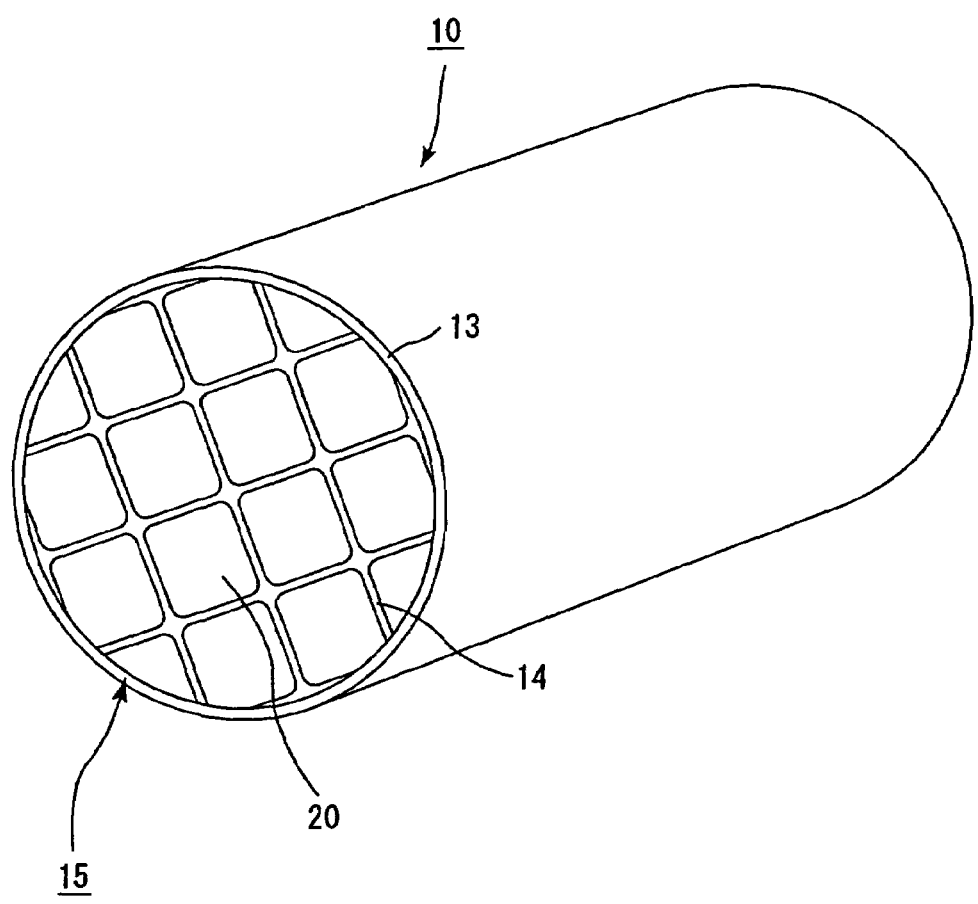
FIG. 7 is a perspective view that schematically shows one example of an aggregated honeycomb structural body of the present invention.
Figure 8:
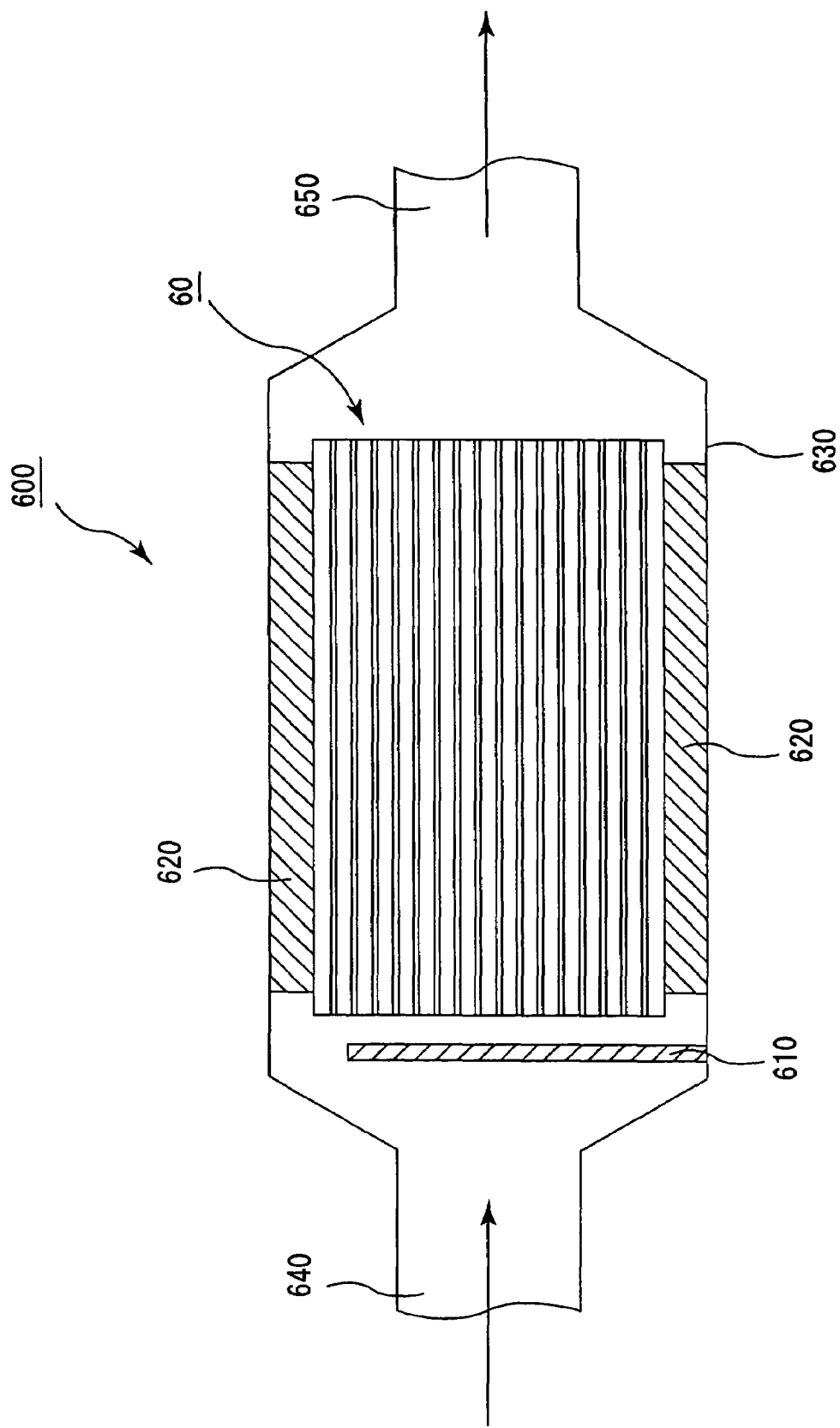
FIG. 8 is a cross-sectional view that schematically shows one example of an exhaust gas purifying device for a vehicle in which the honeycomb structural body of the present invention is installed.
Figure 9:
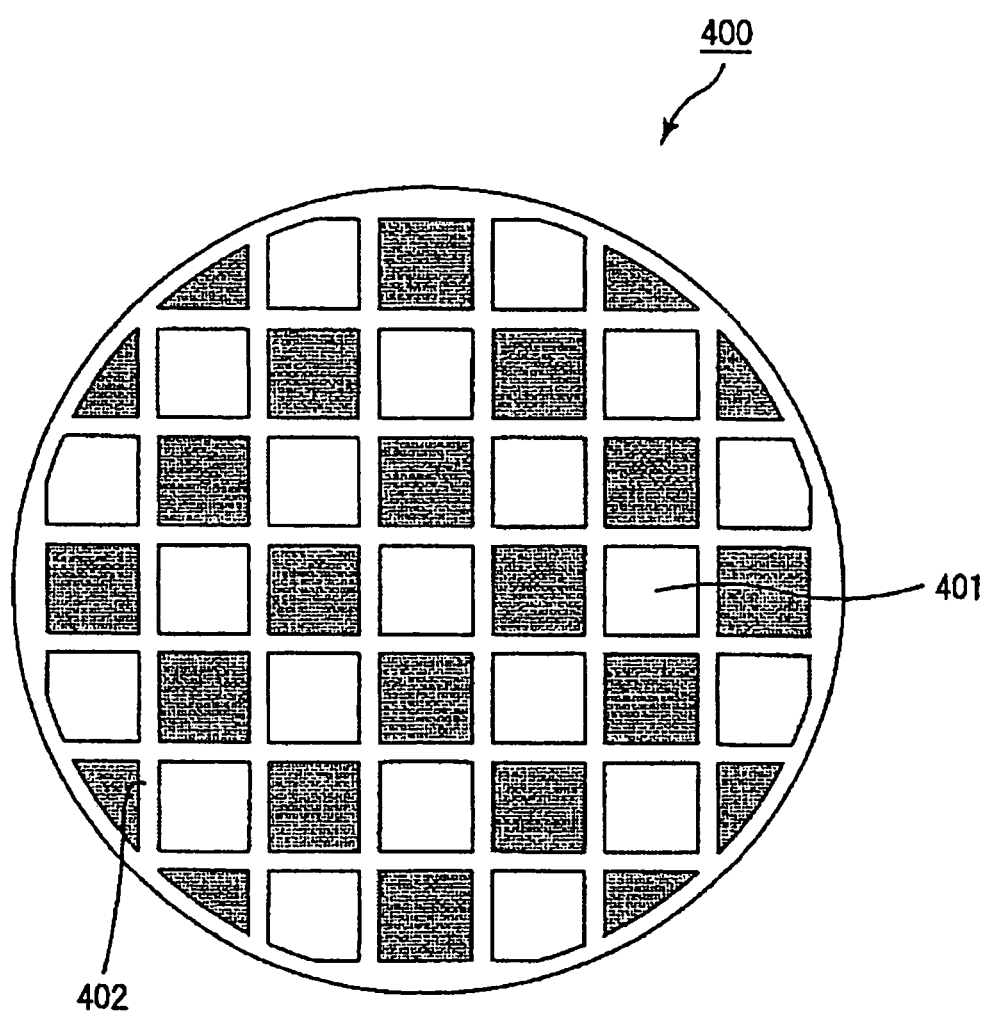
FIG. 9 is a cross-sectional view that schematically shows one example of a conventional honeycomb structural body.

| EXPLANATION OF SYMBOLS | |
|---|---|
| 10 | Integral honeycomb structural body |
| 13 | Sealing material layer |
| 14 | Sealing material layer |
| 15 | Honeycomb block |
| 20 | Integral honeycomb structural body |
| 21 | Through hole |
| 21a | Group of inlet-side through holes |
| 21b | Group of outlet-side through holes |
| 22 | Plug |
| 23 | Partition wall |

The invention claimed is:

1. A pillar-shaped honeycomb structural body comprising: a porous ceramic body in which a plurality of through holes are formed in parallel with one another in a length direction of the porous body and a partition wall portion is interposed between the through holes, the porous body having an inlet side and an outlet side, wherein said plurality of through holes includes a group of inlet-side through holes sealed by plugs at the outlet side and a group of outlet-side through holes sealed by plugs at the inlet side, the inlet-side through holes have the total sum of cross section areas perpendicular to the length direction which is made relatively greater, outlet-side through holes have the total sum of cross section areas perpendicular to the length direction which is made relatively smaller, and the inlet-side through holes and the plugs sealing the inlet-side through hole at the outlet side satisfy inequalities, $0.0157X - 0.0678 < Y < 1.15X - 5$ and $35 \leq X \leq 60$, where X represents an aperture rate on the inlet side in %, and Y represents the total sum of thermal capacities in J/K of the plugs sealing the inlet-side through holes at 500° C. per 11.8 cm² of an end face of the ceramic body on the outlet side including the outlet-side through holes.

2. The honeycomb structural body according to claim 1, wherein the plugs sealing the inlet-side through holes satisfy an equality, $$0.013X-0.09<Z<0.7X-2.5,$$

where Z represents the total sum of thermal capacities in J/K of the plugs sealing the inlet-side through holes at 25° C. per 11.8 cm² of the end face of the ceramic body on the outlet side including the outlet-side through holes.

3. The honeycomb structural body according to claim 1 or 2, wherein the Y satisfies a relationship, $$0.05X-0.0.55<Y<0.574X-2.$$

4. The honeycomb structural body according to claim 3, wherein the Z satisfies a relationship, $$0.05X-0.55<Z<0.354X-1.$$

5. The honeycomb structural body according to claim 1, wherein said porous ceramic body is porous silicon carbide.

6. A honeycomb structural body, wherein a sealing material layer is formed on a circumferential face of a honeycomb block that is formed by combining a plurality of honeycomb structural bodies according to according to claim 1 through a sealing material layer with one another.

7. The honeycomb structural body according to claim 2, wherein said porous ceramic body is porous silicon carbide.

8. The honeycomb structural body according to claim 3, wherein said porous ceramic body is porous silicon carbide.

9. The honeycomb structural body according to claim 4, wherein said porous ceramic body is porous silicon carbide.

10. A honeycomb structural body, wherein a sealing material layer is formed on a circumferential face of a honeycomb block that is formed by combining a plurality of honeycomb structural bodies according to claim 2 through a sealing material layer with one another.

11. A honeycomb structural body, wherein a sealing material layer is formed on a circumferential face of a honeycomb block that is formed by combining a plurality of honeycomb structural bodies according to claim 3 through a sealing material layer with one another.

12. A honeycomb structural body, wherein a sealing material layer is formed on a circumferential face of a honeycomb block that is formed by combining a plurality of honeycomb structural bodies according to claim 4 through a sealing material layer with one another.

13. A honeycomb structural body, wherein a sealing material layer is formed on a circumferential face of a honeycomb block that is formed by combining a plurality of honeycomb structural bodies according to claim 5 through a sealing material layer with one another.

* * * * *

UNITED STATES PATENT AND TRADEMARK OFFICE
CERTIFICATE OF CORRECTION

PATENT NO. : 7,517,502 B2  Page 1 of 1
APPLICATION NO. : 10/521592
DATED : April 14, 2009
INVENTOR(S) : Kazushige Ohno et al.

It is certified that error appears in the above-identified patent and that said Letters Patent is hereby corrected as shown below:

Column 24, line 60, insert --the-- after "greater,".

Column 25, line 17, change "0.05X-0.0.55<Y<0.574X-2" to --0.05X-0.55<Y<0.574X-2--.

Column 25, line 27, delete "according to".

Signed and Sealed this

Twenty-fifth Day of August, 2009

David J. Kappos
*Director of the United States Patent and Trademark Office*